United States Patent
Ranganathan et al.

(10) Patent No.: US 12,432,563 B2
(45) Date of Patent: Sep. 30, 2025

(54) SYSTEM AND METHOD FOR SPAM MESSAGE DETECTION

(71) Applicant: Verizon Patent and Licensing Inc., Basking Ridge, NJ (US)

(72) Inventors: Prakash Ranganathan, Tamilnadu (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 219 days.

(21) Appl. No.: 17/838,328

(22) Filed: Jun. 13, 2022

(65) Prior Publication Data

US 2023/0403559 A1     Dec. 14, 2023

(51) Int. Cl.
*H04W 12/106* (2021.01)
*G06N 3/08* (2023.01)
*H04W 4/14* (2009.01)
*H04W 12/088* (2021.01)

(52) U.S. Cl.
CPC ............ *H04W 12/106* (2021.01); *G06N 3/08* (2013.01); *H04W 4/14* (2013.01); *H04W 12/088* (2021.01)

(58) Field of Classification Search
CPC ....... G06N 3/08; H04L 51/212; H04L 51/214; H04L 63/0227; H04L 63/0236; H04W 12/088; H04W 12/106; H04W 12/128; H04W 4/14
See application file for complete search history.

(56) References Cited

U.S. PATENT DOCUMENTS

| | | | |
|---|---|---|---|
| 2008/0140781 A1* | 6/2008 | Bocharov | G06Q 10/107 709/206 |
| 2010/0287246 A1* | 11/2010 | Klos | H04L 51/48 709/206 |
| 2012/0028606 A1* | 2/2012 | Bobotek | H04L 51/212 455/411 |
| 2012/0030293 A1* | 2/2012 | Bobotek | G06Q 10/107 709/206 |
| 2013/0018964 A1* | 1/2013 | Osipkov | H04L 67/306 709/206 |
| 2014/0004892 A1* | 1/2014 | Murynets | H04W 4/14 455/466 |
| 2018/0131652 A1* | 5/2018 | Smith | H04L 51/212 |
| 2018/0300475 A1* | 10/2018 | Zhang | H04L 63/0272 |
| 2020/0067861 A1* | 2/2020 | Leddy | G06F 21/6245 |
| 2020/0374251 A1* | 11/2020 | Warshaw | H04L 51/56 |
| 2021/0352470 A1* | 11/2021 | Barer | H04L 9/14 |
| 2022/0067146 A1* | 3/2022 | Cai | G06F 21/566 |
| 2022/0360598 A1* | 11/2022 | Moore | H04L 63/0263 |

FOREIGN PATENT DOCUMENTS

WO     WO-2021023678 A1 *  2/2021  ............ H04W 12/08

* cited by examiner

*Primary Examiner* — Theodore C Parsons

(57) ABSTRACT

In an example, a text message sent by a first user equipment (UE) and addressed to a second UE is received. In response to receiving the text message, a set of information associated with the text message is determined based upon information determined by a first carrier of the first UE and/or the second UE. The text message is classified as spam or not spam based upon the set of information.

20 Claims, 11 Drawing Sheets

SYSTEM AND METHOD FOR SPAM MESSAGE DETECTION

BACKGROUND

Spamming comprises the use of communication systems (e.g., messaging systems, email systems, social media systems, etc.) to send unsolicited messages to recipients for at least one of the purpose of commercial advertising, prohibited purposes (e.g., phishing and/or other fraudulent purposes), etc. With the increasing prevalence of mobile device-based data consumption and/or more advanced network technology (e.g., advances in 5G), there has been a large increase in spam messages (e.g., spam text messages) sent to mobile devices, which leads to negative user experiences and/or increasing amounts of identity theft, fraud, etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1A:
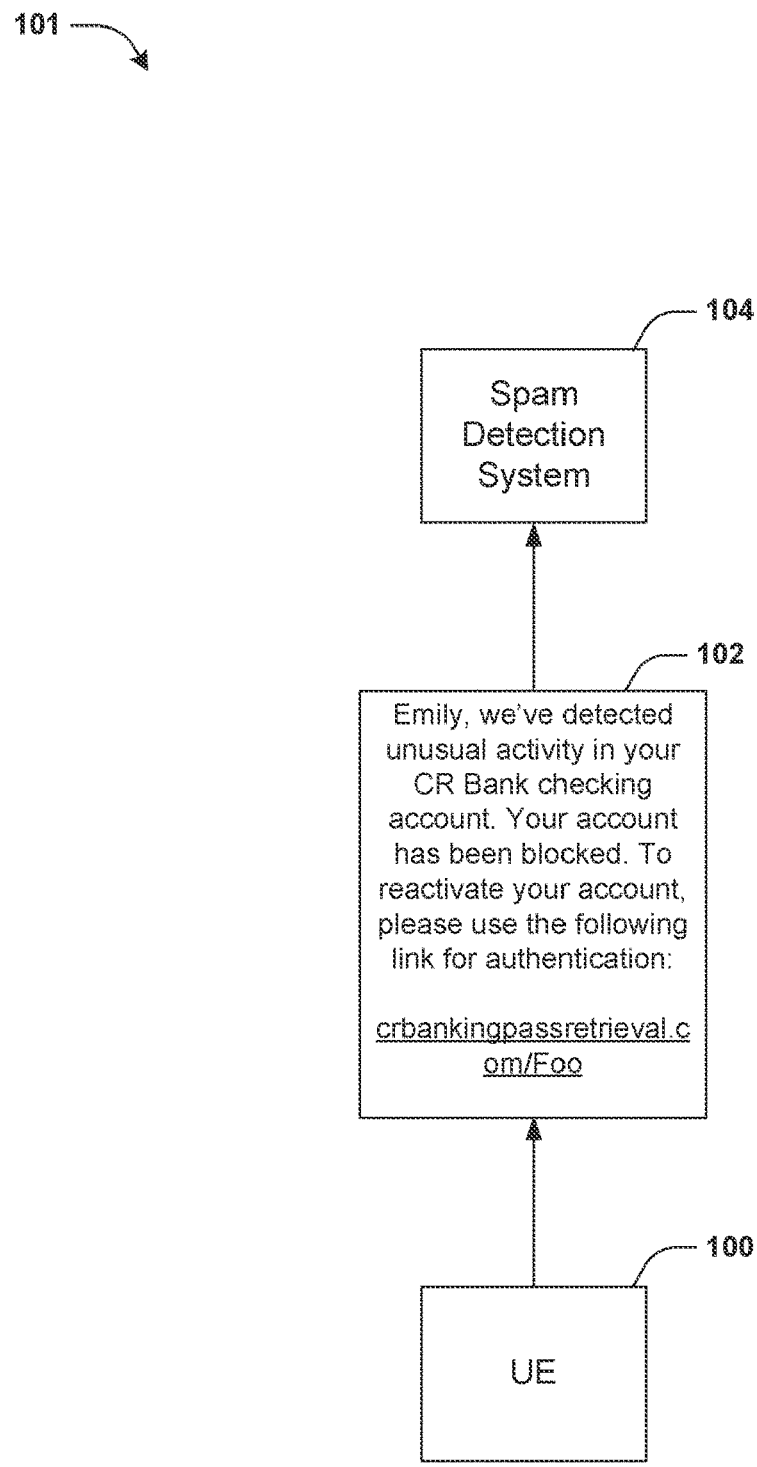
FIG. 1A is a diagram illustrating an example system for performing spam detection, where a first user equipment (UE) sends a first text message that is addressed to a second UE according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for performing spam detection are provided. Spamming comprises the use of communication systems (e.g., messaging systems, email systems, social media systems, etc.) to send unsolicited messages to recipients (e.g., large numbers of recipients) for at least one of the purpose of commercial advertising, prohibited purposes (e.g., phishing and/or other fraudulent purposes), etc. With the increasing prevalence of mobile device-based data consumption and/or more advanced network technology (e.g., advances in 5G), there has been a large increase in spam messages (e.g., spam text messages) sent to mobile devices, which leads to negative user experiences and/or increasing amounts of identity theft, fraud, etc.

Some systems rely upon merely content of a text message and/or user actions performed in response to receiving the text message (such as a user's response to receiving the text message) to classify the text message as spam or not spam. However, since these systems rely merely upon message content and/or user actions for spam detection, they are not robust and are relatively easy to bypass by a malicious entity. Further, some of these systems cannot perform spam detection without already having data related to users' responses to messages sent by malicious actors. Thus, by the time a malicious actor's messages are classified as spam, many spam messages sent by the malicious actor may already have been delivered to various UEs. Some of these messages may be sent as part of phishing attacks to steal sensitive user information, such as by including a link to a malicious web page under the guise of the malicious web page being a legitimate web page (with which the recipients have an account, such as a banking account, a financial account, an email account, etc., for example). Thus, prior to the spam messages being flagged as spam, some users may access the malicious web page (not knowing that the web page is malicious) and may provide sensitive user information via the malicious web (e.g., banking account information, financial account information, email account information, identification information, etc.) that enables a malicious actor to at least one of fraudulently access a user's account, perform identity theft of the user, access other user accounts of the user, hack into a computer and/or accounts of the user, install malicious software on the computer of the user, etc.

In accordance with one or more of the techniques provided herein, a spam detection system is provided. The spam detection system is configured to use information determined by a carrier (e.g., carrier-determined information) to classify a text message as spam or not spam (e.g., the carrier-determined information may comprise information that is exclusively available to the carrier). In accordance with some embodiments, the spam detection system may implement (i) batch inference in which information (e.g., sender information, message information and/recipient information based upon carrier-determined information) associated with messages over a period of time is used to classify senders as malicious or not malicious and/or generate sender profiles of the senders (e.g., the classifications of the senders may be obtained using a classification neural network model); and/or (ii) real time inference in which, in response to receiving a text message, the text message is classified as spam or not spam (prior to delivering the message to a corresponding recipient, for example) based upon carrier-determined information associated with the text message and/or a sender profile generated via the batch inference (e.g., the classification of the text message may be obtained using a classification neural network model). It may be appreciated that using carrier-determined information, implementing batch inference and/or implementing real time inference enables the spam detection system to classify the text message (as spam or not spam) more accurately than other systems that do not use the carrier-determined information, implement batch inference and/or implement real time inference.

The carrier may correspond to a telecommunication service provider (e.g., wireless communication service provider) that provides telecommunication services to a plurality of UEs (e.g., subscribers of the carrier). The carrier-determined information may comprise at least one of a mode of transmission used by a sender of the text message, a geolocation of the sender, a time zone of the sender, a device identifier of the sender, a set of account information of the sender, a mobile country code (MCC) of the sender, a location area code (LAC) of the sender, a media access control (MAC) address of the sender, a public land mobile network (PLMN) of the sender, a phone number (e.g., a mobile telephone number (MTN)) of the sender, etc. The text message may be classified as spam or not spam (based upon the carrier-determined information) using a machine learning model, such as a neural network model (e.g., a classification neural network model).

Using one or more of the techniques provided herein, the spam detection system may classify the text message as spam or not spam prior to the text message being delivered to an intended recipient. Thus, if the text message is classified as spam (e.g., if the text message is unsolicited, used for commercial advertising and/or one or more prohibited purposes), the spam detection system may be able to block the text message from being delivered to the intended recipient entirely. In this way, the intended recipient may not be exposed to unsolicited advertising and/or a potential phishing attack associated with the text message, thereby protecting the intended recipient from at least one of being tricked into revealing sensitive information, being hacked, being a victim of identity theft, etc.

FIGS. 1A-1E illustrate examples of a system 101 for spam detection. FIG. 1A illustrates a first user equipment (UE) 100 sending a first text message 102 that is addressed to a second UE. The first text message 102 comprises a short message service (SMS) message, a multimedia messaging service (MMS) message, a rich communication services (RCS) message, an application-based message (e.g., a message sent using a messaging application), and/or a different type of message. In an example, the first text message 102 may comprise a message body, a sender field and/or a recipient field. The message body may comprise content (e.g., at least one of text, one or more images, one or more videos, audio, etc.) of the first text message 102. The sender field (e.g., at least one of a text label, a "From" field, etc.) may comprise an indication of a sender (e.g., the first UE) of the first text message 102. For example, the sender field may be indicative of a first phone number (e.g., an MTN) of the first UE. The recipient field (e.g., a "To" field) may comprise an indication of a recipient (e.g., the second UE) of the first text message 102. For example, the recipient field may be indicative of a second phone number (e.g., an MTN) of the second UE.

Figure 1B:
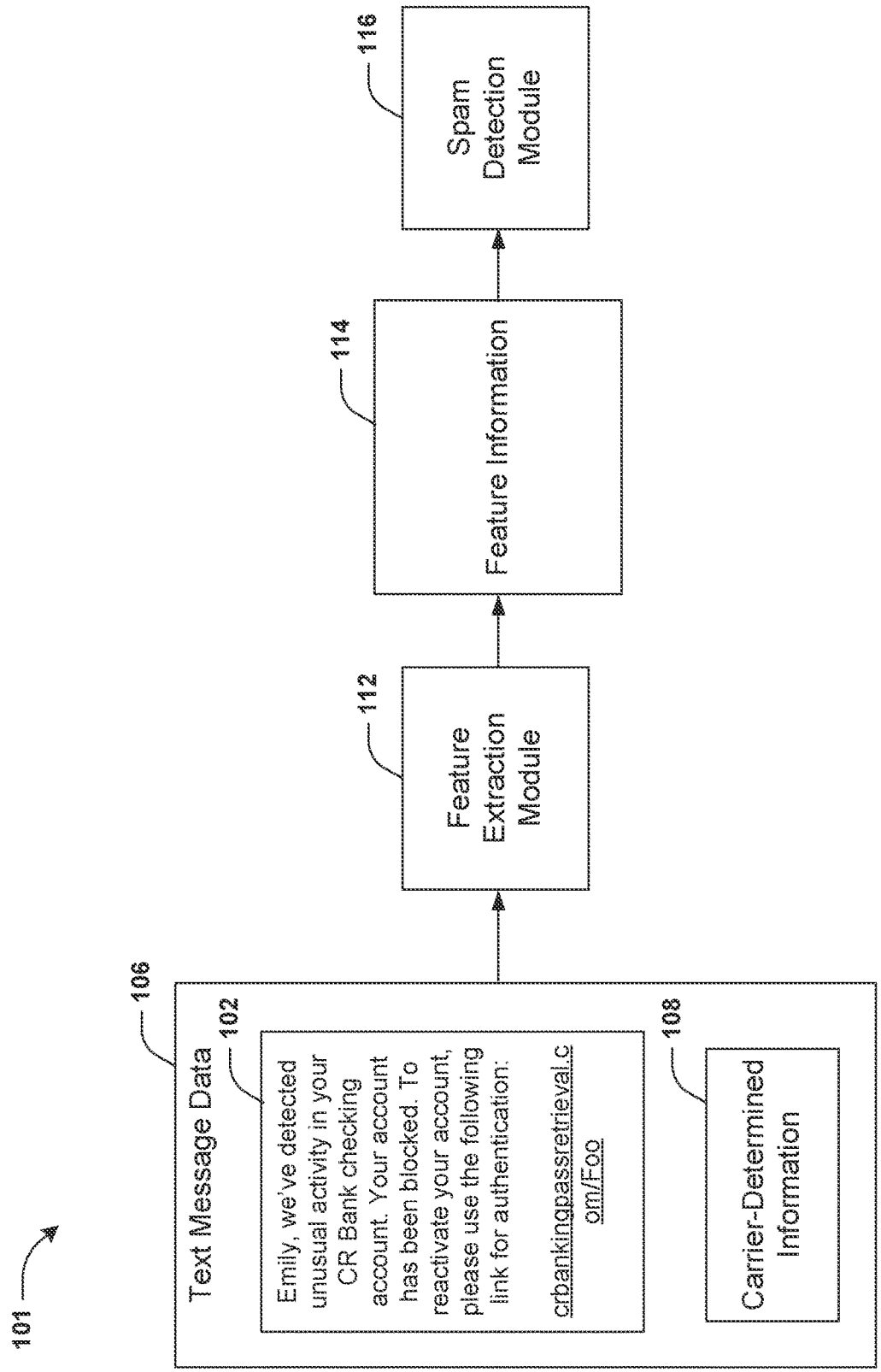
FIG. 1B is a diagram illustrating an example system for performing spam detection, where a first set of information is determined according to some embodiments.
Figure 1C:
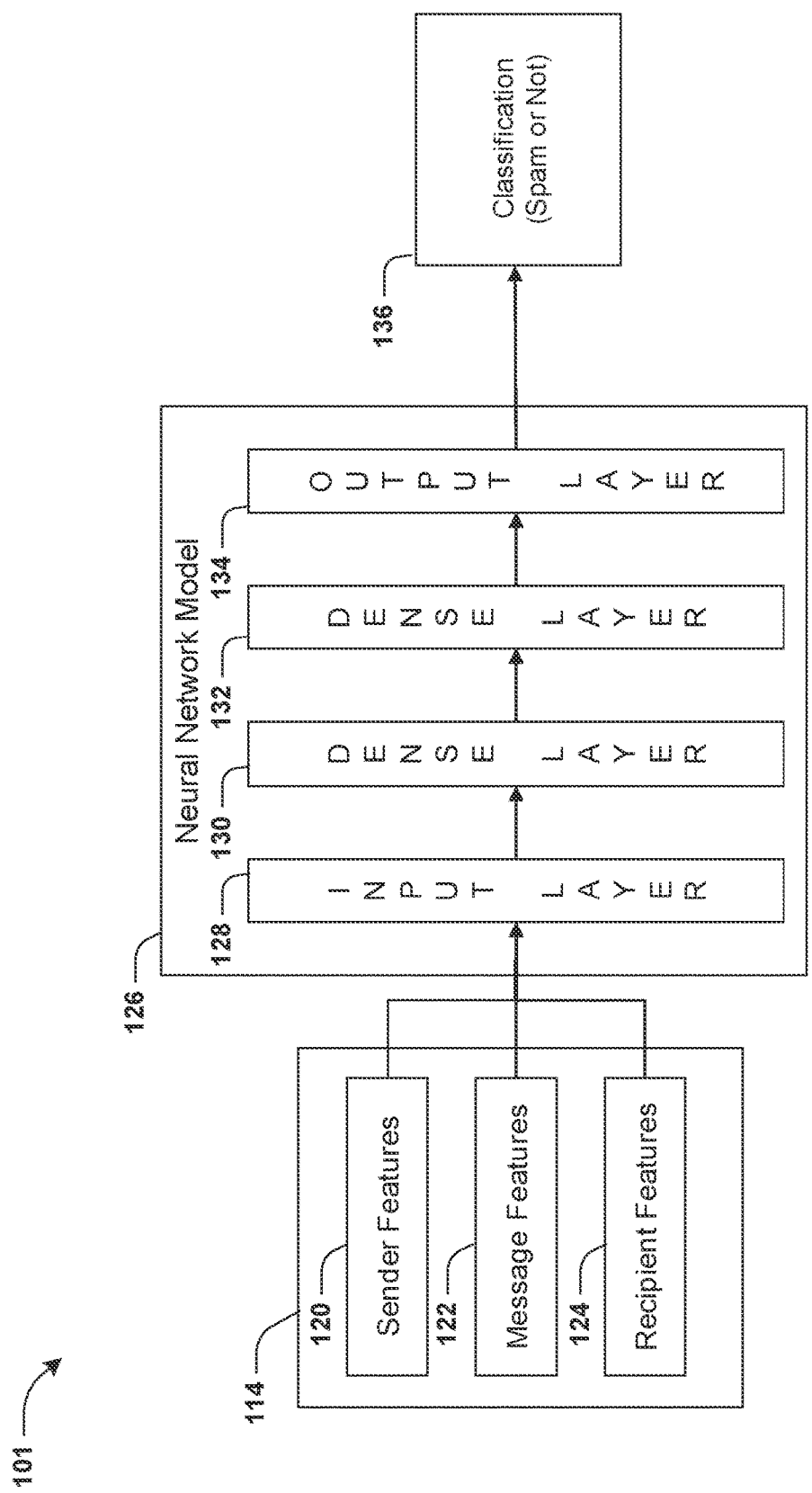
FIG. 1C is a diagram illustrating an example system for performing spam detection, where a first text message is classified as spam or not spam using a first neural network model according to some embodiments.
Figure 1D:
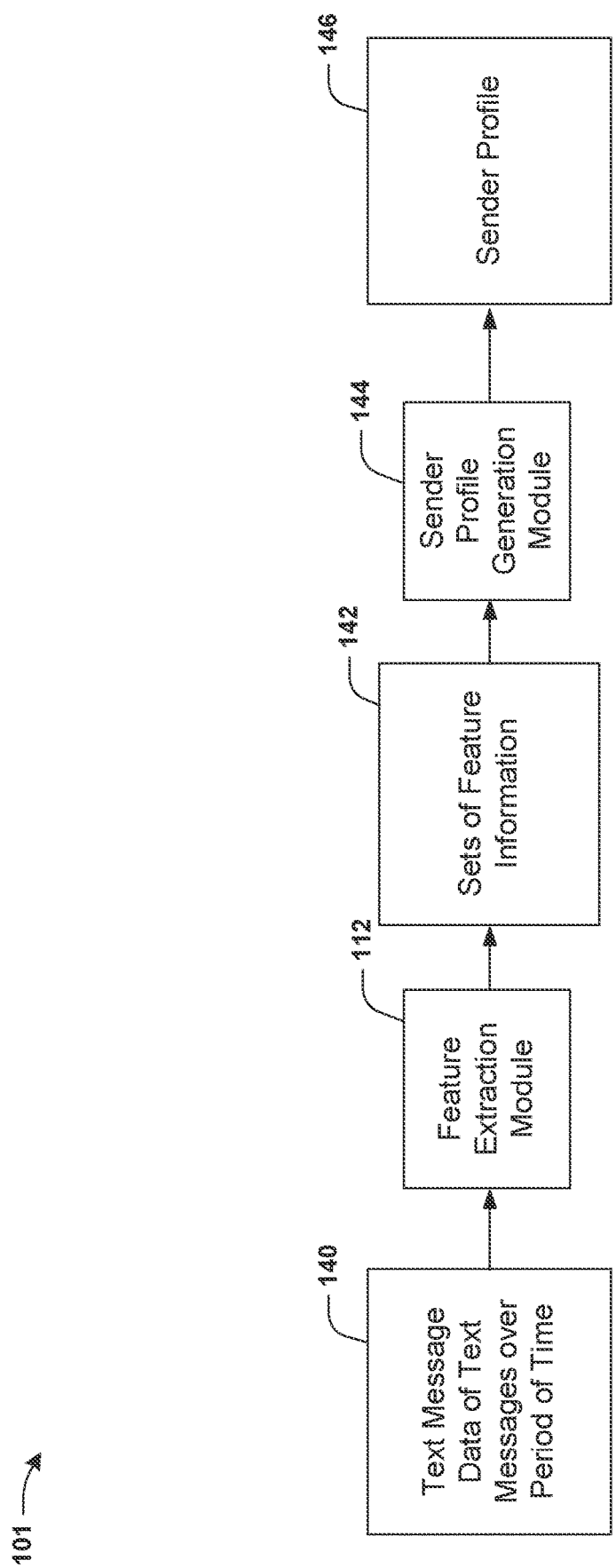
FIG. 1D is a diagram illustrating an example system for performing spam detection, where a sender profile is generated according to some embodiments.
Figure 2:
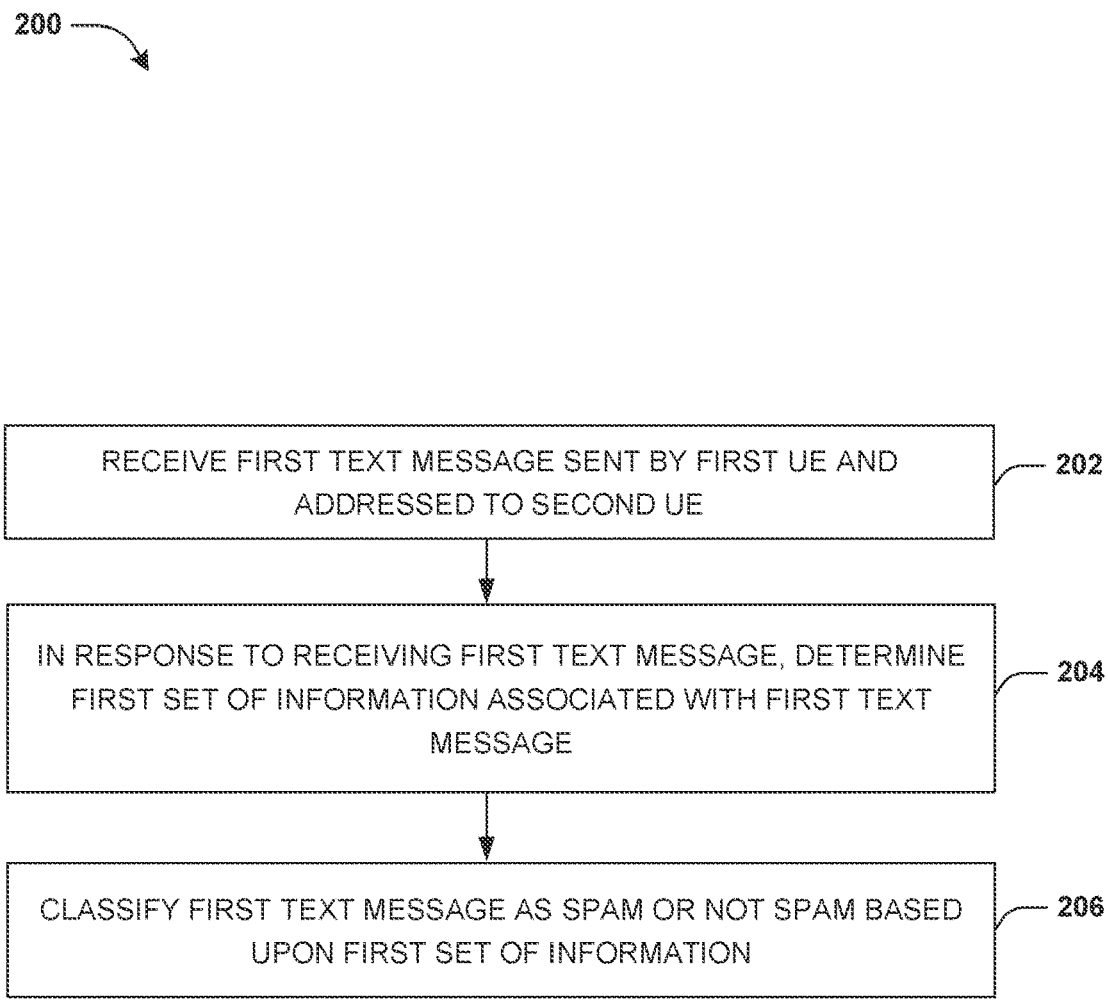
FIG. 2 is a flow chart illustrating an example method for performing spam detection, according to some embodiments.

An embodiment of performing spam detection is illustrated by an exemplary method 200 of FIG. 2, and is further described in conjunction with the system 101 of FIGS. 1A-1D. At 202, the first text message 102 (sent by the first UE 100) is received. For example, the first text message 102 may be received by a spam detection system 104 (shown in FIG. 1A). The spam detection system 104 may receive the first text message 102 directly or indirectly from the first UE 100.

At 204, in response to receiving the first text message 102, a first set of information associated with the first text message 102 may be determined. FIG. 1B illustrates determination of the first set of information (shown with reference number 114). The first set of information 114 may be determined based upon first text message data 106 associated with the first text message 102. The first text message data 106 may comprise the first text message 102 and/or first carrier-determined information 108 (e.g., user fingerprint data). The first text message data 106 may be input to a feature extraction module 112 that determines the first set of information 114 (e.g., feature information) based upon the first text message 102 and/or the first carrier-determined information 108 in the first text message data 106. In an example, the feature extraction module 112 may analyze the first text message data 106 to identify features in the first text message data 106 and/or generate the first set of information 114 to include the identified features. The first set of information 114 may be input to a spam detection module 116 configured to classify, based upon the first text message data 106, the first text message 102 as spam or not spam.

In some examples, the first carrier-determined information 108 comprises information determined by a first carrier of the first UE 100 and/or the second UE. In an example, the first carrier may determine the first carrier-determined information 108 based upon metadata of the first text message 102. Alternatively and/or additionally, the first carrier may determine the first carrier-determined information 108 based upon one or more signals received from the first UE 100.

The first carrier may correspond to a telecommunication service provider (e.g., wireless communication service provider) that provides telecommunication services to the first UE 100 and/or the second UE. For example, the first carrier may provide telecommunication services to subscribers of the first carrier (e.g., the subscribers may comprise UEs with active Subscriber Identity Module (SIM) cards associated with the first carrier). In some examples, telecommunication services provided by the first carrier comprise at least one of cellular service (e.g., 5G service, 4G service, 3G service, 2G service, and/or other type of cellular service), internet service (e.g., cellular internet service, cable internet, digital subscriber line (DSL) internet service, satellite internet service, 5G internet service, and/or other type of internet service), messaging service, etc. In an example, the messaging service may be provided to deliver text messages from and/or to subscribers of the first carrier. The messaging service may be provided using a short message service center (SMSC) of the first carrier. In an example, subscribers of the first carrier (e.g., UEs comprising the first UE 100 and/or the second UE) may be able to at least one of access a network (e.g., a packet-switched network, such as an IP network and/or the Internet), place a telephone call, send and/or receive messages (e.g., text messages), etc. using the telecommunication services. In an example, users may be subscribed to telecommunication service plans with the telecommunication service provider, wherein the telecommunication service provider may receive compensation periodically (e.g., monthly) in accordance with the telecommunication service plans.

In some examples, the first carrier-determined information 108 is indicative of a set of sender characteristics associated with the first UE 100. The first set of information 114 (e.g., feature information indicative of features for use in spam detection) may comprise first sender information determined based upon (e.g., extracted from) the set of sender characteristics.

In some examples, the first sender information of the first set of information 114 may be indicative of a mode of transmission used by the first UE to send the first text message 102. The mode of transmission may be determined based upon (e.g., extracted from) the first carrier-determined information 108. For example, the mode of transmission may correspond to (i) internet-based messaging (e.g., bulk text messaging, such as SMS messaging, that is performed using an internet-based service); (ii) mobile telephone number (MTN)-based messaging (e.g., using a MTN, such as a MTN subscribed to the first carrier or a different carrier, to send text messages); (iii) bulk text messaging (e.g., bulk SMS) used for sending a message (e.g., a single message) to a plurality of users (e.g., bulk text messaging may be used as an advertisement medium to send a promotional message to users, such as potential customers of a brand); and/or (iv) retail text messaging marketing (e.g., retail SMS marketing) used to send time-sensitive messages and/or alerts by text (e.g., businesses may use retail text messaging marketing to provide customers with time-sensitive offers and/or business alerts).

In some examples, the first sender information of the first set of information 114 may be indicative of a geolocation of the first UE 100 and/or a time zone of the first UE 100. The geolocation and/or the time zone may be determined based upon (e.g., extracted from) the first carrier-determined information 108. In some examples, the geolocation may be determined based upon the time zone. In an example, the geolocation may correspond to a continent, a country, a state, a region, etc. associated with the time zone (e.g., the geolocation may be determined to be India based upon the time zone being India Standard Time). In some examples, the first sender information of the first set of information 114 may be indicative of a time of day, in the time zone, at which the first text message 102 is sent by the first UE 100.

In some examples, the first sender information of the first set of information 114 may be indicative of a device identifier of the first UE 100. The device identifier may be determined based upon (e.g., extracted from) the first carrier-determined information 108. The device identifier may comprise an International Mobile Equipment Identity (IMEI) number of the first UE 100. In some examples, the device identifier of the first UE 100 may be compared with a list of device identifiers of compromised devices (e.g., UEs that are determined to be compromised, such as at least one of hacked, stolen, used for malicious activity, etc.) to determine whether or not the first UE 100 is a compromised device. For example, it may be determined that the first UE 100 is a compromised device based upon a determination that the device identifier of the first UE 100 matches a device identifier in the list of device identifiers. Alternatively and/or additionally, it may be determined that the first UE 100 is not a compromised device based upon a determination that the device identifier of the first UE 100 matches a device identifier in the list of device identifiers.

In some examples, the first sender information of the first set of information 114 may be indicative of a carrier of the first UE 100 (e.g., the first sender information of the first set of information 114 may comprise a carrier name of the carrier). The carrier of the first UE 100 may correspond to a telecommunication service provider that provides telecommunication services for the first UE 100. The carrier may be the same as or different than the first carrier (e.g., the first carrier may be a carrier that provides telecommunication services for the second UE that is the intended recipient of the first text message 102). The carrier of the first UE 100 may be determined based upon (e.g., extracted from) the first carrier-determined information 108.

In some examples, the first sender information of the first set of information 114 may be indicative of a set of account information of the first UE 100. The set of account information may be determined based upon (e.g., extracted from) the first carrier-determined information 108. The set of account information may comprise at least one of an account number of an account the first UE 100 has with the carrier of the first UE 100, billing details associated with the account, a plan associated with the account, one or more mobile lines on the account, etc.

In some examples, the first sender information of the first set of information 114 may be indicative of at least one of a mobile country code (MCC) of the first UE 100 (e.g., a MCC of the first phone number of the first UE 100), a location area code (LAC) of the first UE 100 (e.g., a LAC of the first phone number of the first UE 100), a mobile network code (MNC) of the first UE 100 (e.g., the MNC may be indicative of a network, of the carrier of the first UE 100, to which the first UE 100 is connected), a media access control (MAC) address of the first UE 100, a public land mobile network (PLMN) of the first UE 100 (e.g., the PLMN may comprise the MCC and the MNC), etc. The MCC, the LAC, the MNC, the MAC address and/or the PLMN may be determined based upon (e.g., extracted from) the first carrier-determined information 108. In some examples, the geolocation of the first UE 100 is determined based upon the PLMN, the MCC and/or the LAC (e.g., the MCC may be indicative of a country of the first UE 100 and/or the LAC may be indicative of region, in the country, of the first UE 100).

In some examples, the first sender information of the first set of information 114 may be indicative of one or more measures of text messaging activity of the first UE 100. In some examples, the one or more measures of text messaging activity of the first UE 100 may be determined based upon (e.g., extracted from) the first carrier-determined information 108. In an example, the one or more measures of text messaging activity may comprise a rate at which the first UE 100 sends text messages. Alternatively and/or additionally, the one or more measures of text messaging activity may comprise a gap between text messages sent by the first UE 100. For example, the gap may correspond to an average duration of time between consecutive text messages sent by the first UE 100.

In some examples, the first sender information of the first set of information 114 may be indicative of a measure of matching text messages that match the first text message 102. In some examples, the one or more measures of text messaging activity of the first UE 100 may be determined based upon (e.g., extracted from) the first carrier-determined information 108. The measure of matching text messages may correspond to a quantity of a plurality of matching text messages that match the first text message 102. The plurality of matching text messages may comprise one or more messages sent by the first UE 100 and/or one or more messages sent by other UEs. In an example, a text message may be determined to match the first text message 102 (and/or the text message may be included in the plurality of matching text messages) based upon a determination that: (i) content of the text message is the same as content of the first text message 102; (ii) metadata of the text message is the same as metadata of the first text message 102; and/or (iii) a similarity score associated with a similarity between the text message and the first text message 102 meets (e.g., is equal to or exceeds) a threshold similarity score (e.g., the similarity score may be determined using one or more of the techniques provided herein with respect to determining the similarity score associated with the third text message and the second text message).

The first set of information 114 may comprise first message information determined based upon content of the first text message 102. In some examples, the first message information of the first set of information 114 may comprise the content of the first text message 102 (e.g., the content of the first text message 102 may comprise raw message text and/or other content).

In some examples, the first message information of the first set of information 114 may be indicative of one or more errors in the first text message 102, wherein the one or more errors may comprise one or more grammatical errors, one or more spelling errors and/or one or more punctuation errors in the first text message 102 (e.g., the content of the first text message 102 may be analyzed, such as using one or more natural language processing (NLP) techniques, to identify the one or more errors). In an example, the one or more errors may comprise at least one of duplicate words, meaningless words, extra and/or out of place punctuation marks, etc.

In some examples, the first message information of the first set of information 114 may be indicative of a link (e.g., a hyperlink that directs to a web page on the Internet) in the first text message 102 (e.g., the content of the first text message 102 may be analyzed to identify the link). A first legitimacy status of the link may be determined. The first message information of the first set of information 114 may be indicative of the first legitimacy status of the link. The first legitimacy status may be indicative of whether or not the link is a legitimate link.

In some examples, determining the first legitimacy status may comprise (i) determining an entity that the first text message 102 implies the link is associated with; and/or (ii) determining whether or not the link is associated with (e.g., owned by) the entity. For example, based upon the first text message 102 comprising "CR Bank checking account", it may be determined that the entity is "CR Bank". In some examples, in order to determine whether or not the link is associated with (e.g., owned by) the entity, the link may be analyzed to determine a domain name of the link (e.g., in an example in which the link is "crbankingpassretrieval.com/Foo", the domain name may be determined to be "crbankingpassretrieval.com"). In some examples, registration information of the domain name may be analyzed to determine an owner of the domain name. The link may be determined to be a legitimate link (and/or the first legitimacy status may be indicative of the link being a legitimate link) based upon a determination that the owner of the domain name matches the entity. The link may be determined to be an illegitimate link (and/or the first legitimacy status may be indicative of the link being an illegitimate link) based upon a determination that the owner of the domain name does not match the entity.

Alternatively and/or additionally, the link may be determined to be an illegitimate link (and/or the first legitimacy status may be indicative of the link being an illegitimate link) based upon a determination that the owner of the domain name is blacklisted (e.g., the owner of the domain name is included in a list of blacklisted entities, such as entities that are known to be associated with performing at least one of unsolicited advertising, phishing, malicious activity, prohibited activity, etc.).

Alternatively and/or additionally, the first legitimacy status may be determined based upon a location associated with the domain name (e.g., a country in which the domain name is registered). For example, the location associated with the domain name may be compared with a location of the entity (e.g., the entity that the first text message 102 implies the link is associated with, such as "CR Bank"). In an example, the entity "CR Bank" may be a United States-based bank (e.g., a location of the entity may be the United States). The link may be determined to be a legitimate link (and/or the first legitimacy status may be indicative of the link being a legitimate link) based upon a determination that the location associated with the domain name matches the location associated with the entity (e.g., the location associated with the domain name and the location associated with the entity are both the United States). The link may be determined to be an illegitimate link (and/or the first legitimacy status may be indicative of the link being an illegitimate link) based upon a determination that the location associated with the domain name does not match the location associated with the entity (e.g., the location associated with the domain name is outside the United States and the location associated with the entity is the United States).

Alternatively and/or additionally, the first legitimacy status may be determined based upon one or more security parameters associated with the web page that the link directs to. For example, whether or not the web page is secured (e.g., secured with a secure communication protocol, such as Hypertext Transfer Protocol Secure (HTTPS) and/or other secure communication protocol) may be determined. The link may be determined to be a legitimate link (and/or the first legitimacy status may be indicative of the link being a legitimate link) based upon a determination that the web page is secured (e.g., based upon a determination that the web page uses a secure protocol, such as HTTPS, for secure communication). The link may be determined to be an illegitimate link (and/or the first legitimacy status may be indicative of the link being an illegitimate link) based upon a determination that the web page is not sufficiently secured (e.g., based upon a determination that the web page does not use a sufficiently secure protocol for secure communication, such as based upon a determination that the web page uses Hypertext Transfer Protocol (HTTP)).

In some examples, the first carrier-determined information 108 is indicative of a set of recipient characteristics associated with the second UE. The first set of information 114 may comprise first recipient information determined based upon (e.g., extracted from) the set of recipient characteristics. In some examples, the first recipient information may be determined using one or more of the techniques provided herein with respect to determining the first sender information. In some examples, the first recipient information is indicative of at least one of a geolocation of the second UE, a time zone of the second UE, a device identifier (e.g., an IMEI number) of the second UE, a carrier of the second UE (e.g., the first carrier), a MCC of the second UE, a LAC of the second UE, a MNC of the second UE, a MAC address of the second UE, a PLMN of the second UE, etc.

At 206, the first text message 102 is classified as spam or not spam based upon the first set of information 114. For example, the first text message 102 may be classified as spam or not spam by the spam detection module 116. In some examples, the classification of the first text message 102 as spam or not spam is determined before the first text message 102 is delivered to the second UE. For example, the classification of the first text message 102 may be determined in real time (e.g., via real time inference implemented by the spam detection system 104) in response to receiving the first text message 102 (from the first UE 100, for example). Alternatively and/or additionally, the classification of the first text message 102 as spam or not spam may be determined before the second UE outputs an alert (e.g., a notification) indicating reception of the first text message 102.

In some examples, the spam detection module 116 may generate a spam likelihood score, associated with the first text message 102, based upon the first set of information 114. The spam likelihood score may correspond to a likelihood that the first text message 102 is spam. In an example, whether or not the first text message 102 is classified as spam may be based upon the spam likelihood score. For example, the first text message 102 may be classified as spam based upon a determination that the spam likelihood score meets (e.g., is equal to or exceeds) a threshold spam likelihood score. Alternatively and/or additionally, the first text message 102 may be classified as spam based upon a determination that the spam likelihood score does not meet the threshold spam likelihood score.

In some examples, the spam likelihood score may be generated based upon the mode of transmission indicated by the first sender information of the first set of information 114. For example, as compared to a scenario in which the first set of information 114 indicates that the mode of transmission is MTN-based messaging (e.g., which may be reflective of normal text messaging activity), the spam likelihood score may be higher in a scenario in which the first set of information 114 indicates that the mode of transmission is internet-based messaging, bulk text messaging and/or retail text message marketing (e.g., a text message sent via internet-based messaging, bulk text messaging and/or retail text message marketing may have a higher likelihood of being spam than a text message sent via MTN-based messaging).

In some examples, the spam likelihood score may be determined based upon the geolocation of the first UE 100. Some regions have higher rates of spam activity than other regions. For example, regions that are determined to have more than a threshold amount of spam activity may be included in a list of regions (e.g., a list of countries, states and/or cities). The geolocation may be compared with the list of regions. In some examples, as compared to a scenario in which the geolocation of the first UE 100 does not match (e.g., is not within) a region of the list of regions, the spam likelihood score may be higher in a scenario in which the geolocation of the first UE 100 matches (e.g., is within) a region of the list of regions.

In some examples, the spam likelihood score may be determined based upon the time of day that the first UE sends the first text message 102. For example, as compared to a scenario in which the first set of information 114 indicates that the time of day is within a first time range associated with normal messaging (e.g., the first time range may be from 7:00 AM to 1:00 AM), the spam likelihood score may be higher in a scenario in which the first set of information 114 indicates that the time of day is within a second time range (e.g., the second time range may be from 1:00 AM to 7:00 AM). For example, a text message sent in the second time range (from 1:00 AM to 7:00 AM, for example) may have a higher likelihood of being spam than a text message sent in the first time range (from 7:00 AM to 1:00 AM, for example).

In some examples, the spam likelihood score may be determined based upon a measure of text messaging activity (e.g., at least one of the rate at which the first UE 100 sends text messages, the quantity of text messages of the plurality of text messages that are sent by the first UE 100, the gap between text messages sent by the first UE 100, etc.) of the one or more measures of text messaging activity. In some examples, the spam likelihood score may be a function of the rate at which the first UE 100 sends text messages where an increase of the rate at which the first UE 100 sends text messages may correspond to an increase of the spam likelihood score (e.g., a higher rate at which the first UE 100 sends text messages may correspond to a higher likelihood that the first text message 102 is spam). Alternatively and/or additionally, the spam likelihood score may be a function of the quantity of text messages where an increase of the quantity of text messages may correspond to an increase of the spam likelihood score (e.g., a higher quantity of text messages sent by the first UE 100 may correspond to a higher likelihood that the first text message 102 is spam). Alternatively and/or additionally, the spam likelihood score may be a function of the gap between text messages where an increase of the gap may correspond to a decrease of the spam likelihood score (e.g., a smaller gap between text messages sent by the first UE 100 may correspond to a higher likelihood that the first text message 102 is spam).

In some examples, the spam likelihood score may be determined based upon the measure of matching text messages associated with the first text message 102. In some examples, the spam likelihood score may be a function of the measure of matching text messages where an increase of the measure of matching text messages may correspond to an increase of the spam likelihood score. For example, a higher measure of matching text messages may correspond to a higher likelihood that the first text message 102 is spam. For example, the measure of matching text messages exceeding a threshold may indicate that matching text messages associated with the first text message 102 are being sent to different UEs in order to get a large number of users to view and/or interact with the matching text messages.

In some examples, the spam likelihood score may be determined based upon the device identifier (e.g., the IMEI number) of the first UE 100. For example, the spam likelihood score may be determined based upon whether or not the first UE 100 is determined to be a compromised device. For example, as compared to a scenario in which the first set of information 114 indicates that the first UE 100 is not a compromised device, the spam likelihood score may be higher in a scenario in which the first set of information 114 indicates that the first UE 100 is a compromised device (e.g., the first set of information 114 indicating that the first UE 100 is a compromised device may correspond to an indication that the first UE 100 is at least one of stolen, hacked, used for malicious activity, etc. and thus, may be associated with a higher likelihood that the first text message 102 sent by the first UE 100 is spam).

In some examples, the spam likelihood score may be determined based upon a quantity of errors of the one or more errors (e.g., grammatical errors, spelling errors and/or punctuation errors) in the first text message 102. In some examples, the spam likelihood score may be a function of the quantity of errors, where an increase of the quantity of errors of the first text message 102 may correspond to an increase of the spam likelihood score (e.g., a higher quantity of errors may correspond to a higher likelihood that the first text message 102 is spam).

In some examples, the spam likelihood score may be determined based upon the first legitimacy status of the link included in the first text message 102. For example, as compared to a scenario in which the first legitimacy status indicates that the link is legitimate, the spam likelihood score may be higher in a scenario in which the first legitimacy status indicates that the link is illegitimate (e.g., the first legitimacy status indicating that the link is illegitimate may correspond to an indication that the link is being sent for malicious purposes, such as to trick a user of the second UE into accessing a web page that can be used to at least one of deploy malicious software on the second UE, trick the user of the second UE into revealing sensitive information, etc.).

In some examples, the classification of the first text message 102 as spam or not spam is determined using a first machine learning model, such as at least one of a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model, a random forest model, a machine learning model used to perform dimensional reduction, a machine learning model used to perform gradient boosting, etc. For example, the spam likelihood score may be determined using the first machine learning model. In an example, the first machine learning model comprises a first neural network model, such as a neural network model used for classification (e.g., a classification neural network model, such as a multi-label neural classification network). In some examples, the first neural network model comprises a multi-layer perceptron model (e.g., a dense multi-layer perceptron model), such as a sequential multi-layer perceptron model. Alternatively and/or additionally, the first neural network model may comprise a transformer-based model, such as an attention-based transformer model and/or a self-attention model. In some examples, the first machine learning model (e.g., the first neural network model) uses deep learning to determine the classification of the first text message 102 as spam or not spam.

FIG. 1C illustrates the classification (shown with reference number 136) of the first text message 102 as spam or not spam being determined using the first neural network model (shown with reference number 126). The first set of information 114, comprising the first sender information (shown with reference number 120), the first message information (shown with reference number 122) and/or the first recipient information (shown with reference number 124), may be input to the first neural network model 126, wherein the first neural network model 126 classifies the first text message 102 as spam or not spam based upon the first set of information 114 (e.g., based upon the first sender information 120, the first message information 122 and/or the first recipient information 124). In some examples, the spam detection module 116 may comprise the first neural network model 126. The first neural network model 126 may comprise a plurality of layers, such as a plurality of layers of a multi-layer perceptron model (e.g., a sequential multi-layer perceptron model). In an example, each layer of one, some and/or all layers of the plurality of layers may be a dense layer, such as a fully connected dense layer. In some examples, an activation function of the first neural network model 126 (e.g., the sequential multi-layer perceptron model) may comprise a leaky rectified linear unit (ReLU). In some examples, a loss function of the first neural network model 126 (e.g., the sequential multi-layer perceptron model) may comprise categorical cross-entropy. In an example, the plurality of layers comprises a first layer 128 (e.g., an input layer), a second layer 130 (e.g., a first dense layer connected to the input layer), a third layer 132 (e.g., a second dense layer connected to the first dense layer) and/or a fourth layer 134 (e.g., an output layer connected to the second dense layer), wherein the classification 136 may be output by the fourth layer 134.

In some examples, the first machine learning model (e.g., the first neural network model 126) is trained using training information (e.g., labeled training information) comprising a plurality of sets of information associated with a plurality of text messages. In some examples, each set of information of the plurality of sets of information comprises (i) sender information associated with a text message of the plurality of text messages and a sender of the text message (e.g., the sender information may be determined using one or more of the techniques provided herein with respect to determining the first sender information 120); (ii) message information based upon content of the text message (e.g., the message information may be determined using one or more of the techniques provided herein with respect to determining the first message information 122); (iii) recipient information associated with a text message of the plurality of text messages and a recipient of the text message (e.g., the recipient information may be determined using one or more of the techniques provided herein with respect to determining the first recipient information 124); and/or (iv) an indication of whether or not the text message is classified as spam (e.g., a classification label classifying the text message as spam or not spam). In some examples, at least some of the training information may be curated for use in teaching the first machine learning model to differentiate between spam messages and non-spam messages. Alternatively and/or additionally, at least some of the training information may comprise and/or be based upon text messages received from UEs. By training the first machine learning model using the training information, the first machine learning model learns to accurately determine whether or not an input text message is spam, and thus the first machine learning model may accurately determine the classification 136 of the first text message 102 as spam or not spam.

In some examples, a sender profile associated with the first UE 100 may be generated based upon text messaging activity of the first UE 100 and/or one or more other UEs over a period of time (e.g., one day, three days, one week, etc.). For example, the sender profile may be generated based upon text messages sent by the first UE 100 (and/or text messages sent by one or more other UEs) over the period of time (e.g., the text messages may be received by the spam detection system 104 during the period of time). In some examples, one or more sender profiles associated with one or more UEs (comprising the sender profile associated with the first UE 100) may be generated and/or updated periodically using one or more of the techniques provided herein with respect to generating the sender profile associated with the first UE 100. In an example, in which the period of time corresponds to a period of one day, the sender profile associated with the first UE 100 (and/or other sender profiles associated with other UEs) may be generated once per day based upon new and/or recent text messaging activity.

FIG. 1D illustrates generation of the sender profile (shown with reference number 146). In some examples, a plurality of sets of information 142 associated with a plurality of text messages may be determined based upon text message data 140 associated with the plurality of text messages. The plurality of text messages may comprise messages sent by the first UE 100 and/or text messages sent by one or more other UEs during the period of time. In an example, the plurality of text messages may comprise some or all text messages sent using the first carrier during the first period of time. The text message data 140 may comprise the plurality of text messages and/or a plurality of sets of carrier-determined information associated with the plurality of text messages. A set of carrier-determined information of the plurality of sets of carrier-determined information may be determined by the first carrier (and/or a different carrier). For example, each set of carrier-determined information of the plurality of sets of carrier-determined information may be associated with a text message of the plurality of text messages, and/or may be indicative of a set of sender characteristics associated with a sender (e.g., a UE) of a text message of the plurality of text messages and/or a set of set of recipient characteristics associated with a recipient of the text message, wherein the set of recipient characteristics may be indicative of one or more actions performed by the recipient in response to the text message being delivered.

In some examples, the text message data 140 associated with the plurality of text messages (received during the period of time) may be input to the feature extraction module 112. In some examples, for each text message of one, some and/or all of the plurality of text messages, the text message data 140 may comprise the text message and/or a set of carrier-determined information.

In some examples, the plurality of sets of information 142 (e.g., a plurality of sets of feature information) associated with the plurality of text messages may be determined based upon the text message data 140. Each set of information of the plurality of sets of information 142 may be associated with a text message of the plurality of text messages, wherein the set of information may be determined based upon the text message, a set of carrier-determined information (of the plurality of sets of carrier-determined information) associated with the text message, and/or other information associated with the text message. The text message data 140 associated with the plurality of text messages may be input to the feature extraction module 112 that determines the plurality of sets of information 142 (e.g., sets of feature information associated with the plurality of text messages) based upon the text message data 140. In an example, the feature extraction module 112 may analyze the text message data 140 to identify features in the text message data 140 and/or generate the plurality of sets of information 142 to include the identified features. The plurality of sets of information 142 may be input to a profile generation module 144, wherein the profile generation module 144 may output the sender profile 146 associated with the first UE 100 and/or one or more other sender profiles associated with one or more other UEs.

In an example, the plurality of sets of information 142 may comprise a second set of information associated with a second text message sent by the first UE 100 and addressed to a third UE. The second set of information may be generated using one or more of the techniques provided herein with respect to the first set of information 114. The second set of information may comprise second sender information associated with the first UE 100, second message information associated with the second text message, and/or second recipient information associated with the third UE.

In some examples, the second sender information of the second set of information may be indicative of a mode of transmission used by the first UE 100 to send the second text message, a geolocation of the first UE 100, a time zone of the first UE 100, a device identifier (e.g., IMEI number) of the first UE 100, a carrier of the first UE 100, a set of account information of the second UE, a MCC of the first UE 100, a LAC of the first UE 100, a MNC of the first UE 100, a MAC address of the first UE 100, a PLMN of the first UE 100, etc.

In some examples, the second message information of the second set of information may be indicative of at least one of a second legitimacy status of the third UE, one or more errors in the second text message, etc. In some examples, the second recipient information of the second set of information may be indicative of at least one of a geolocation of the third UE (e.g., the recipient of the second text message), a time zone of the third UE, a device identifier (e.g., an IMEI number) of the third UE, a carrier of the third UE, a MCC of the third UE, a LAC of the third UE, a MNC of the third UE, a MAC address of the third UE, a PLMN of the third UE, etc.

In some examples, a difference between the second set of information (associated with the second text message) and the first set of information 114 (associated with the first text message 102) is the second set of information may be generated after the second text message is delivered to the third UE, whereas the first set of information 114 may be generated before the first text message 102 is delivered to the second UE. In some examples, recipient behavior data indicative of one or more actions performed by the third UE in response to receiving the second text message may be available to (and/or determined by) at least one of the first carrier, the spam detection system 104, the feature extraction module 112, etc. For example, the recipient behavior data indicative of the one or more actions by the third UE may be included in a set of carrier-determined information (e.g., a set of carrier-determined information, of the plurality of sets of carrier-determined information, based upon which the second set of information associated with the second text message is generated) input to the feature extraction module 112. Accordingly, the second recipient information of the second set of information may be generated (based upon the recipient behavior data) such that the second recipient information is indicative of the one or more actions performed by the third UE in response to the second text message being delivered. For example, the one or more actions may comprise at least one of displaying the second text message (via a messaging interface on the third UE, for example), responding to the second text message, accessing a link within the second text message, deleting the second text message, reporting the second text message as spam, blocking a phone number associated with the first UE 100 (to prevent messages from the first UE 100 from reaching the third UE, for example), etc.

In some examples, the sender profile 146 associated with the first UE 100 may be indicative of an active time range associated with the first UE 100. For example, the active time range may be based upon times of day of text messages sent by the first UE 100. For example, the times of day may be determined based upon a time zone associated with the first UE 100 and/or timestamps of text messages (of the plurality of text messages) that are sent by the first UE 100. For example, the active time range may correspond to a period of time, during the day, during which the first UE 100 most actively sends text messages. Alternatively and/or additionally, the active time range may correspond to a period of time, during the day, during which at least a threshold proportion (e.g., 60%, 70%, etc.) of text messages sent by the first UE 100 are sent. In an example in which the threshold proportion is 70%, the active time range being between 1:00 AM and 5:00 AM may indicate that at least 70% of messages sent by the first UE 100 are sent between 1:00 AM and 5:00 AM according to the time zone of the first UE 100.

In some examples, the sender profile 146 associated with the first UE 100 may be indicative of one or more geolocations of the first UE 100. The one or more geolocations may be determined based upon geolocations indicated by sets of information, of the plurality of sets of information 142, associated with text messages sent by the first UE 100.

In some examples, the sender profile 146 associated with the first UE 100 may be indicative of one or more modes of transmission of the first UE 100. The one or more modes of transmission may be determined based upon modes of transmission indicated by sets of information, of the plurality of sets of information 142, associated with text messages sent by the first UE 100.

In some examples, the sender profile 146 may be indicative of one or more measures of text messaging activity of the first UE 100. In an example, the one or more measures of text messaging activity may comprise a rate at which the first UE 100 sends text messages. The rate may correspond to a quantity of text messages, of the plurality of text messages, sent by the first UE 100 per unit of time (e.g., the unit of time may correspond to a minute, 5 minutes, etc.). Alternatively and/or additionally, the one or more measures of text messaging activity may comprise a quantity of text messages, of the plurality of text messages, that are sent by the first UE 100. Alternatively and/or additionally, the one or more measures of text messaging activity may comprise a gap between text messages sent by the first UE 100. For example, the gap may correspond to an average duration of time between consecutive text messages sent by the first UE 100.

In some examples, the sender profile 146 may be indicative of a measure of matching text messages, of the plurality of text messages, that match a text message (of the plurality of text messages) sent by the first UE 100. For example, the plurality of text messages may be analyzed based upon the second text message sent by the first UE 100 to identify a plurality of matching text messages, of the plurality of text messages, that match the second text message. The measure of matching text messages may correspond to a quantity of text messages of the plurality of matching text messages. The plurality of matching text messages may comprise one or more messages sent by the first UE 100 and/or one or more messages sent by other UEs. In an example, a third text message may be determined to match the second text message (and/or the third text message may be included in the plurality of matching text messages) based upon a determination that: (i) content of the third text message is the same as content of the second text message; (ii) metadata of the third text message is the same as metadata of the second text message; and/or (iii) a similarity score associated with a similarity between the third text message and the second text message meets (e.g., is equal to or exceeds) a threshold similarity score. In some examples, the similarity score associated with the third text message and the second text message is indicative of a level of similarity between the second text message and the third text message. In some examples, a first vector representation (e.g., a first embedding and/or a first embedding-based representation) of the second text message and/or a second vector representation (e.g., a second embedding and/or a second embedding-based representation) of the third text message may be generated. The similarity score may be determined based upon the first vector representation and/or the second vector representation. In an example, one or more operations (e.g., mathematical operations) may be performed using the first vector representation and the second vector representation to determine the similarity score (e.g., the similarity score may be based upon (and/or may be equal to) a measure of similarity between the first vector representation and the second vector representation, such as a cosine similarity and/or a distance between the first vector representation and the second vector representation).

In some examples, the sender profile 146 may be indicative of a measure of negative signals received in association with text messages sent by the first UE 100. For example, the measure of negative signals may correspond to a rate at which negative signals are received in association with text messages sent by the first UE 100. The rate may correspond to a quantity of negative signals received in response to text messages sent by the first UE 100 per unit of time (e.g., the unit of time may correspond to a minute, minutes, etc.). Alternatively and/or additionally, the measure of negative signals may comprise a quantity of negative signals received in response to text messages, of the plurality of text messages, sent by the first UE 100. In an example, a negative signal may correspond to a signal, received from a recipient of a text message sent by the first UE 100, that comprises at least one of an indication that the first UE 100 is blocked from sending text messages to the recipient, an indication that the text message is spam, etc. For example, the recipient may transmit the negative signal in response to receiving the text message.

In some examples, the sender profile 146 associated with the first UE 100 may be indicative of a measure of illegitimate link-containing text messages sent by the first UE 100. For example, the measure of illegitimate link-containing text messages may correspond to a rate at which the first UE 100 sends text messages containing links that are determined to be illegitimate (e.g., a legitimacy status of the links indicates that the links are illegitimate, such as determined using one or more of the techniques provided herein with respect to the first legitimacy status). The rate may correspond to a quantity of text messages, containing illegitimate links, that are sent by the first UE 100 per unit of time (e.g., the unit of time may correspond to a minute, minutes, etc.). Alternatively and/or additionally, the one or more measures of text messaging activity may comprise a quantity of text messages, of the plurality of text messages, that are sent by the first UE 100 and contain illegitimate links.

In some examples, the sender profile 146 associated with the first UE 100 may be indicative of a measure of text message errors associated with the first UE 100. For example, the measure of text message errors may correspond to an average quantity of errors (e.g., grammatical errors, spelling errors and/or punctuation errors) per text message sent by the first UE 100.

In some examples, the first UE 100 may be classified as malicious or not malicious (e.g., safe) based upon the plurality of sets of information 142, the active time range, the one or more geolocations, the one or more modes of transmission, the one or more measures of text messaging activity, the measure of matching text messages, the measure of illegitimate link-containing text messages, the measure of text message errors and/or the measure of negative signals. In some examples, the classification of the first UE 100 (as malicious or not malicious) may be included in the sender profile 146.

In some examples, a malicious likelihood score associated with the first UE 100 may be generated based upon the plurality of sets of information 142. The malicious likelihood score may correspond to a likelihood that the first UE 100 is malicious. In an example, whether or not the first UE 100 is classified as spam may be based upon the malicious likelihood score. For example, the first UE 100 may be classified as spam based upon a determination that the malicious likelihood score meets (e.g., is equal to or exceeds) a threshold malicious likelihood score. Alternatively and/or additionally, the first UE 100 may be classified as spam based upon a determination that the malicious likelihood score does not meet the threshold malicious likelihood score.

In some examples, the malicious likelihood score may be generated based upon the active time range associated with the first UE 100. For example, as compared to a scenario in which the active time range is within the first time range associated with normal messaging, the malicious likelihood score may be higher in a scenario in which the first set of information 114 indicates that the active time range is within and/or overlaps with the second time range.

In some examples, the malicious likelihood score may be determined based upon the one or more geolocations, of the first UE 100, indicated by the sender profile 146. In some examples, as compared to a scenario in which a geolocation of the one or more geolocations does not match (e.g., is not within) a region of the list of regions, the malicious likelihood score may be higher in a scenario in which a geolocation of the one or more geolocations matches (e.g., is within) a region of the list of regions.

In some examples, the malicious likelihood score may be determined based upon the device identifier (e.g., the IMEI number) of the first UE 100 (e.g., the sender profile 146 may be indicative of the device identifier), such as based upon a determination of whether or not the first UE 100 is determined to be a compromised device.

In some examples, the malicious likelihood score may be determined based upon the one or more modes of transmission, of the first UE 100, indicated by the sender profile 146. For example, as compared to a scenario in which a mode of transmission of the one or more modes of transmission is MTN-based messaging (e.g., which may be reflective of normal text messaging activity of the first UE 100), the malicious likelihood score may be higher in a scenario in which a mode of transmission of the one or more modes of transmission is internet-based messaging, bulk text messaging and/or retail text message marketing.

In some examples, the malicious likelihood score may be determined based upon a measure of text messaging activity (e.g., at least one of the rate at which the first UE 100 sends text messages, the quantity of text messages of the plurality of text messages that are sent by the first UE 100, the gap between text messages sent by the first UE 100, etc.), of the one or more measures of text messaging activity, indicated by the sender profile 146. In some examples, the malicious likelihood score may be a function of the rate at which the first UE 100 sends text messages where an increase of the rate at which the first UE 100 sends text messages may correspond to an increase of the malicious likelihood score (e.g., a higher rate at which the first UE 100 sends text messages may correspond to a higher likelihood that the first UE 100 is malicious). Alternatively and/or additionally, the malicious likelihood score may be a function of the quantity of text messages where an increase of the quantity of text messages may correspond to an increase of the malicious likelihood score (e.g., a higher quantity of text messages sent by the first UE 100 may correspond to a higher likelihood that the first UE 100 is malicious). Alternatively and/or additionally, the malicious likelihood score may be a function of the gap between text messages where an increase of the gap may correspond to a decrease of the malicious likelihood score (e.g., a smaller gap between text messages sent by the first UE 100 may correspond to a higher likelihood that the first UE 100 is malicious).

In some examples, the malicious likelihood score may be determined based upon the measure of matching text messages indicated by the sender profile 146. In some examples, the malicious likelihood score may be a function of the measure of matching text messages where an increase of the measure of matching text messages may correspond to an increase of the malicious likelihood score. For example, a higher measure of matching text messages may correspond to a higher likelihood that the first UE 100 is malicious. For example, the measure of matching text messages exceeding a threshold may indicate that the first UE 100 (and/or other UEs that are acting in coordination with the first UE 100) are sending the same or similar messages to different UEs in order to get a large number of users to view and/or interact with spam messages. In some examples, a group of UEs comprising the first UE 100 and/or the other UEs (that are acting in coordination with the first UE 100) may be classified as malicious based upon the determination that the measure of matching text messages exceeds the threshold, wherein the group of UEs may be blacklisted and/or delivery of text messages sent by the group of UEs may be blocked based upon the classification of the group of UEs as malicious. Alternatively and/or additionally, recipients that previously received text messages from the group of UEs may be notified that the text messages are spam.

In some examples, the malicious likelihood score may be determined based upon the measure of negative signals indicated by the sender profile 146. In some examples, the malicious likelihood score may be a function of the measure of negative signals where an increase of the measure of negative signals may correspond to an increase of the malicious likelihood score.

In some examples, the malicious likelihood score may be determined based upon the measure of illegitimate link-containing text messages indicated by the sender profile 146. In some examples, the malicious likelihood score may be a function of the measure of illegitimate link-containing text messages where an increase of the measure of illegitimate link-containing text messages may correspond to an increase of the malicious likelihood score.

In some examples, the malicious likelihood score may be determined based upon the measure of text message errors indicated by the sender profile 146. In some examples, the malicious likelihood score may be a function of the measure of text message errors where an increase of the measure of text message errors may correspond to an increase of the malicious likelihood score.

In some examples, the classification of the first UE 100 (as malicious or not malicious) may be determined using a second machine learning model, such as at least one of a tree-based model, a machine learning model used to perform linear regression, a machine learning model used to perform logistic regression, a decision tree model, a SVM, a Bayesian network model, a kNN model, a K-Means model, a random forest model, a machine learning model used to perform dimensional reduction, a machine learning model used to perform gradient boosting, etc. For example, the malicious likelihood score may be determined using the second machine learning model. In an example, the second machine learning model comprises a second neural network model, such as a neural network model used for classification (e.g., a classification neural network model, such as a multi-label neural classification network). In some examples, the second neural network model comprises a multi-layer perceptron model (e.g., a dense multi-layer perceptron model), such as a sequential multi-layer perceptron model. Alternatively and/or additionally, the second neural network model may comprise a transformer-based model, such as an attention-based transformer model and/or a self-attention model. In some examples, the second machine learning model is the same as or different than the first machine learning model. In some examples, the second machine learning model is generated and/or trained using one or more of the techniques provided herein with respect to the first machine learning model. In some examples, information that comprises the plurality of sets of information 142, the active time range, the one or more geolocations, the one or more modes of transmission, the one or more measures of text messaging activity, the measure of matching text messages, the measure of illegitimate link-containing text messages, the measure of text message errors and/or the measure of negative signals may be input to the second machine learning model. The second machine learning model may output the classification of the first UE 100 (as malicious or not malicious) based upon the information.

In some examples, the sender profile 146 may be generated and/or the classification of the first UE 100 may be determined via batch inference. For example, an embodiment shown in and/or described with respect to FIG. 1D may correspond to at least a part of a batch inference pipeline used (periodically and/or asynchronously, for example) to generate sender profiles for UEs and/or classify the UEs as malicious or not malicious.

In some examples, based upon the classification of the first UE 100 as malicious, one or more actions may be performed. The one or more actions may comprise: (i) flagging the first UE 100 as malicious; (ii) transmitting notifications, to UEs that previously received text messages from the first UE 100, that indicate that the first UE 100 and/or the first phone number of the first UE 100 are malicious (in order to warn users of the UEs to not trust the text messages sent by the first UE 100, for example); (iii) blocking messages sent by the first UE 100 from being sent to their intended recipients; (iv) automatically classifying text messages sent by the first UE 100 as spam; (v) canceling and/or discontinuing telecommunication service to the first UE 100 to prevent the first UE 100 from being able to use telecommunication services; and/or (vi) reporting the first UE 100 to relevant authorities, such as authorities in charge of mitigating and/or prosecuting cases of phishing and/or other internet crimes.

In some examples, information comprising at least some of the sender profile 146 is included in the first set of information 114 used to determine whether or not the first text message 102 is spam. For example, the information (included in the first set of information 114) may comprise the classification of the first UE 100 (as malicious or not malicious), the active time range, the one or more geolocations, the one or more modes of transmission, the one or more measures of text messaging activity, the measure of matching text messages, the measure of illegitimate link-containing text messages, the measure of text message errors and/or the measure of negative signals. In some examples, including the information in the first set of information 114 (and/or determining the classification of the first text message 102 as spam or not spam based upon the information) increases an accuracy with which the first text message 102 is classified as spam or not spam.

In some examples, the spam likelihood score associated with the first text message 102 may be determined based upon the malicious likelihood score. In some examples, the spam likelihood score may be a function of the malicious likelihood score where an increase of the malicious likelihood score may correspond to an increase of the spam likelihood score.

In some examples, the first text message 102 may be classified as spam based upon a determination that the first UE 100 is classified as malicious.

In some examples, the spam detection system 104 may determine whether or not to deliver the first text message 102 to the second UE based upon the classification 136 of the first text message 102 (as spam or not spam).

In some examples, based upon the first text message 102 being classified as not spam, the first text message 102 may be transmitted to the second UE (and/or the first text message 102 and/or a notification of the first text message 102 may be displayed via the second UE).

In some examples, based upon the first text message 102 being classified as spam, the first text message 102 may not be transmitted (e.g., not delivered) to the second UE. Alternatively and/or additionally, based upon the first text message 102 being classified as spam, the first text message 102 and/or a notification of the first text message 102 may not be displayed via the second UE.

In some examples, classification of the first text message 102 as spam may correspond to a determination that the first text message 102 is at least one of a text message (e.g., unsolicited text message) sent for commercial advertising, a text message sent to implement a phishing attack, a text message sent for one or more other prohibited and/or malicious purposes, etc.

Alternatively and/or additionally, based upon the first text message 102 being classified as spam, an indication that the first text message 102 is spam may be transmitted to the second UE (e.g., the indication that the first text message 102 is spam may be transmitted to the second UE in conjunction with transmitting the first text message 102 to the second UE), and/or the indication may be displayed via the first text message 102. In some examples, the indication that the first text message 102 is spam may be displayed while the first text message 102 is displayed (e.g., the indication that the first text message 102 is spam and the first text message 102 may be displayed on the same page and/or the same interface).

Alternatively and/or additionally, based upon reception of the indication that the first text message 102 is spam, the second UE may treat the first text message 102 differently than other text messages that are not marked as spam. For example, text messages that are not classified as spam may be included in a text message inbox (e.g., a main text message inbox) accessible via a messaging interface of the second UE. Based upon the first text message 102 being classified as spam, the first text message 102 may be included in a group of spam text messages.

Figure 1E:
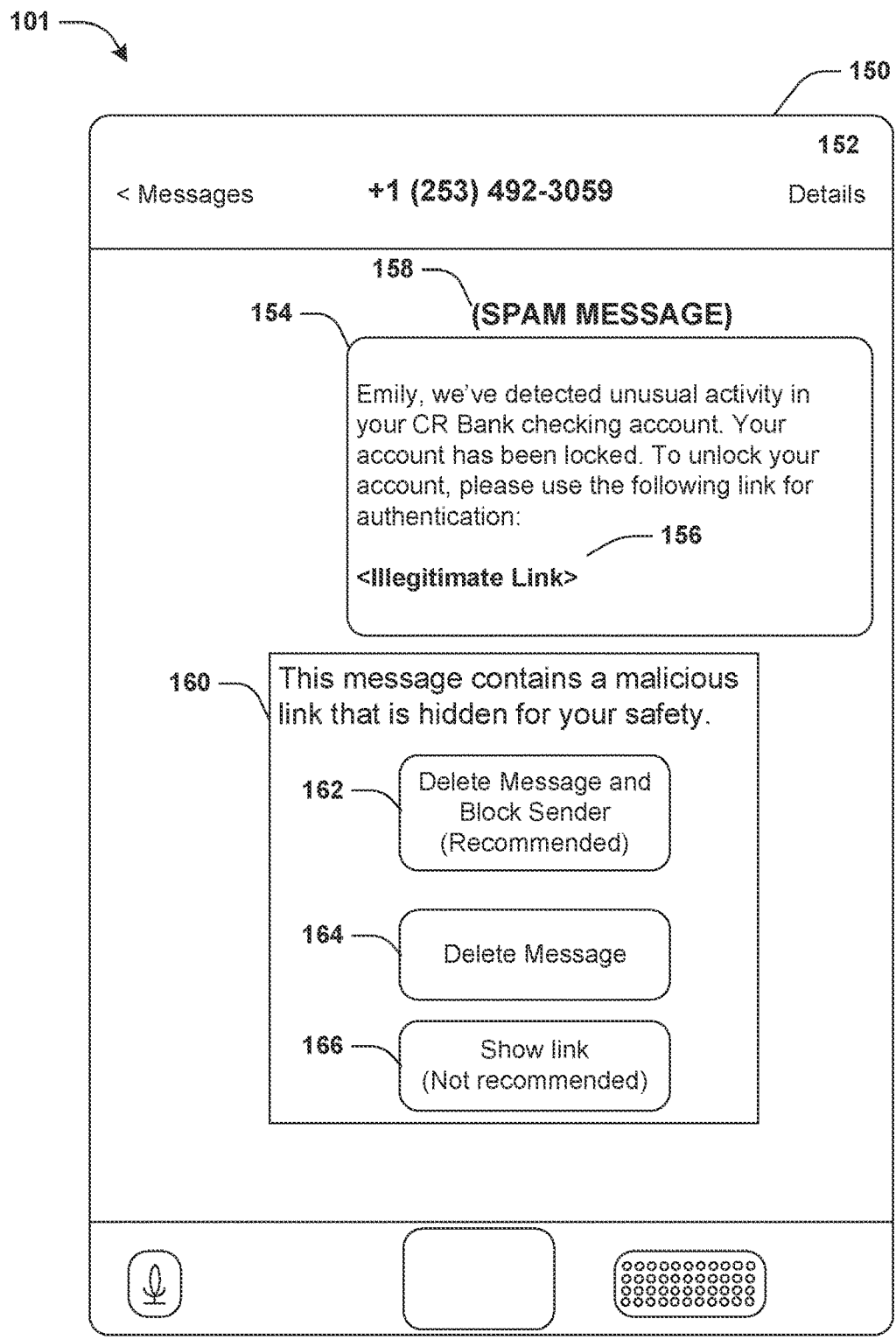
FIG. 1E is a diagram illustrating an example system for performing spam detection, where a first text message is displayed via a second UE according to some embodiments.

FIG. 1E illustrates the first text message 102 being displayed via the second UE (shown with reference number 150), according to an example scenario in which the first text message 102 is classified as spam and/or the first legitimacy status indicates that the link in the first text message 102 (e.g., "crbankingpassretrieval.com/Foo") is illegitimate. In some examples, a representation 154 of the first text message 102 may be displayed via a text messaging interface 152 on the second UE 150.

In some examples, based upon the first text message 102 being classified as spam, an indication 158 that the first text message 102 is spam may be displayed via the text messaging interface 152. For example, the indication 158 may be displayed adjacent to (e.g., above, below, or to a side of) the representation 154 of the first text message 102.

In some examples, the text messaging interface 152 may be controlled based upon the first legitimacy status indicating that the link in the first text message 102 is illegitimate. In an example, the representation 154 may hide (e.g., not display) the link in the first text message 102. For example, the representation 154 may display an indication 156 that the link in the first text message 102 is illegitimate. In some examples, the indication 156 may be displayed in place of the link. For example, the indication 156 may be located in a position where the link would be displayed if the link were determined to be legitimate. In some examples, a selection of the indication 156 may not result in the second UE 150 accessing the web page associated with the link. For example, based upon the first legitimacy status indicating that the link in the first text message 102 is illegitimate, the text messaging interface 152 may not provide a functionality for the link to be selected and/or copied (to protect a user of the second UE 150 from accessing the web page). In some examples, an illegitimate link interface 160 may be displayed via the text messaging interface 152. For example, the illegitimate link interface 160 may be displayed automatically in conjunction with displaying the representation 154 of the first text message 102. Alternatively and/or additionally, the illegitimate link interface 160 may be displayed in response to a selection (e.g., a click using a mouse and/or cursor, a finger tap using a touchscreen, etc.) of the indication 156 that the link is an illegitimate link. In an example, the illegitimate link interface 160 may indicate that the link in the first text message 102 is illegitimate. Alternatively and/or additionally, the illegitimate link interface 160 may comprise one or more selectable inputs associated with one or more options. The one or more selectable inputs may comprise a first selectable input 162 associated with deleting the first text message 102 from the second UE 150 and/or blocking text messages from the first UE 100 (and/or messages from the first phone number of the first UE 100) from being delivered to the second UE 150. The one or more selectable inputs may comprise a second selectable input 164 associated with deleting the first text message 102 from the second UE 150 (without blocking text messages from the first UE 100, for example). The one or more selectable inputs may comprise a third selectable input 166 associated with showing the link. In some examples, in response to a selection of the third selectable input 166, the link may be displayed via the text messaging interface 152 (e.g., the link may be displayed within the representation 154 of the first text message 102). In some examples, when the link is displayed via the text messaging interface 152, the link may be selectable such that a selection of the link directs the second UE 150 to access and/or open the web page associated with the link (using a browser of the second UE 150, for example).

In the examples shown in FIGS. 1A-1E, the first text message 102 may be sent by the first UE 100 to the second UE 150 (and/or to other UEs) in an attempt to trick a user of the second UE 150 into believing that the link directs to a web page that is to be used for unlocking a bank account. However, the web page that the link directs to may not actually be associated with a bank (e.g., "CR Bank") associated with the bank account. Rather, the web page that the link directs to may actually be hosted by a malicious entity that uses the web page to attempt to trick a user of the second UE 150 into providing sensitive information (e.g., account information associated with the bank account, identification information associated with the user, such as a social security number and/or other form of identification, etc.) that can be used to access the user's bank account and/or access other accounts of the user. Thus, by using one or more of the techniques provided herein, the spam detection system 104 may prevent the user from being tricked into revealing the sensitive information, and thus may protect the user from fraudulent activity (e.g., theft, impersonation, etc.) on the user of the second UE 150.

In some examples, the first text message 102 may comprise an unsolicited text message, such as used for commercial advertising and/or one or more prohibited purposes.

At least some of the techniques provided herein may be implemented using the spam detection system 104.

In some examples, at least some of the present disclosure may be performed and/or implemented automatically and/or in real time. For example, at least some of the present disclosure may be performed and/or implemented (by the spam detection system 104, for example) such that in response to receiving the first text message 102, the classification 136 of the first text message 102 (as spam or not spam) is determined quickly (e.g., instantly) and/or in real time.

In some examples, a user of the second UE 150 may opt out of one or more services provided by the spam detection system 104. For example, if the user of the second UE 150 opts out of the one or more services, messages that are classified as spam may be delivered to the second UE 150 (and/or indications that the messages are classified as spam may not be transmitted to the second UE 150).

Figure 3:
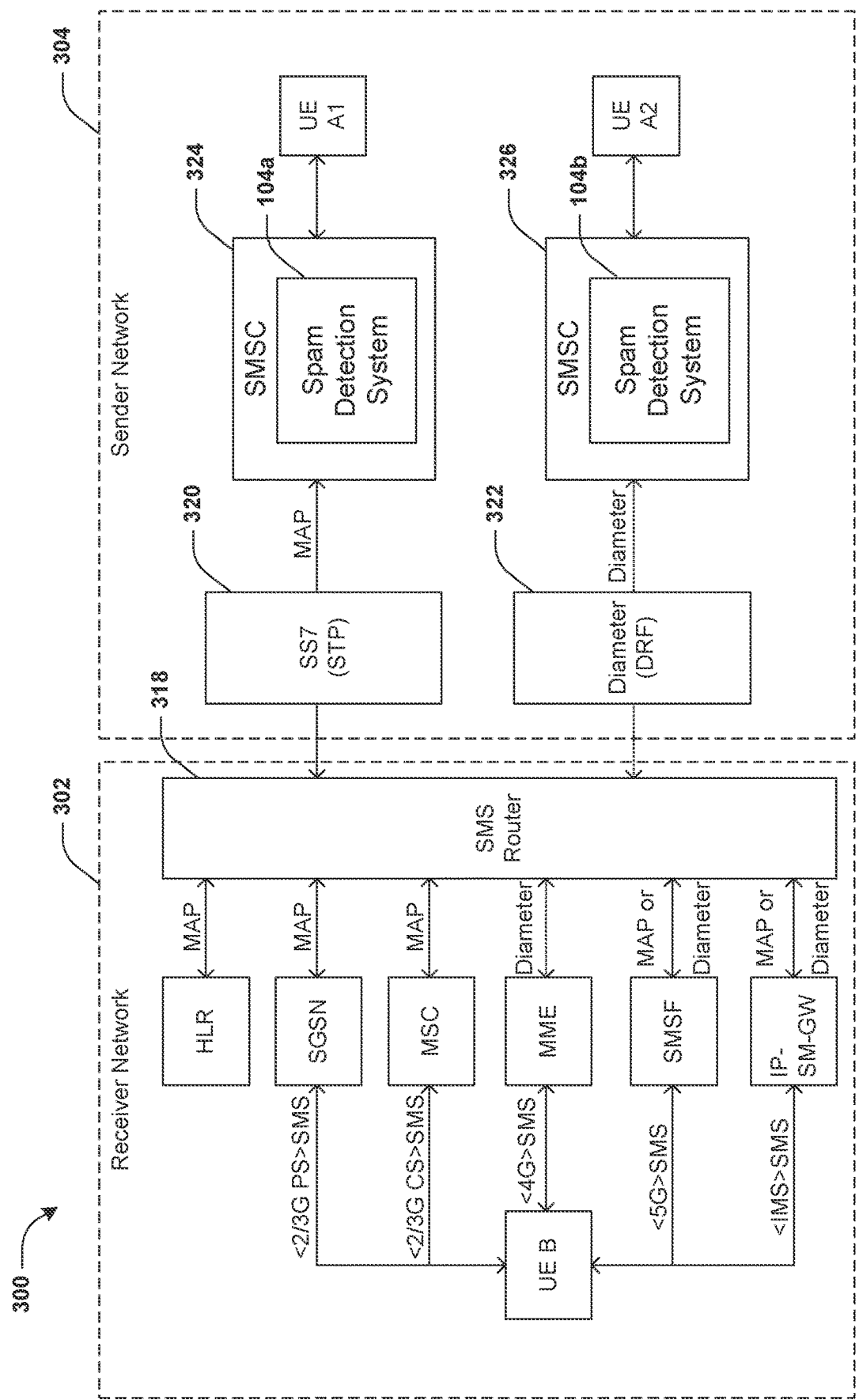
FIG. 3 is an illustration of an example system in which a spam detection system is implemented, according to some embodiments.
Figure 4:
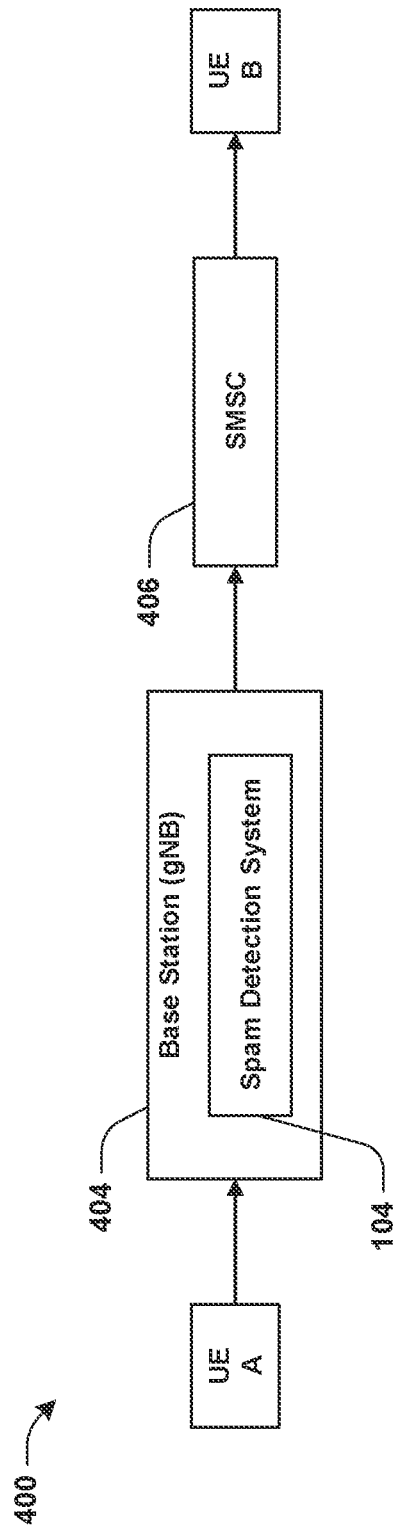
FIG. 4 is an illustration of an example system in which a spam detection system is implemented, according to some embodiments.
Figure 5:
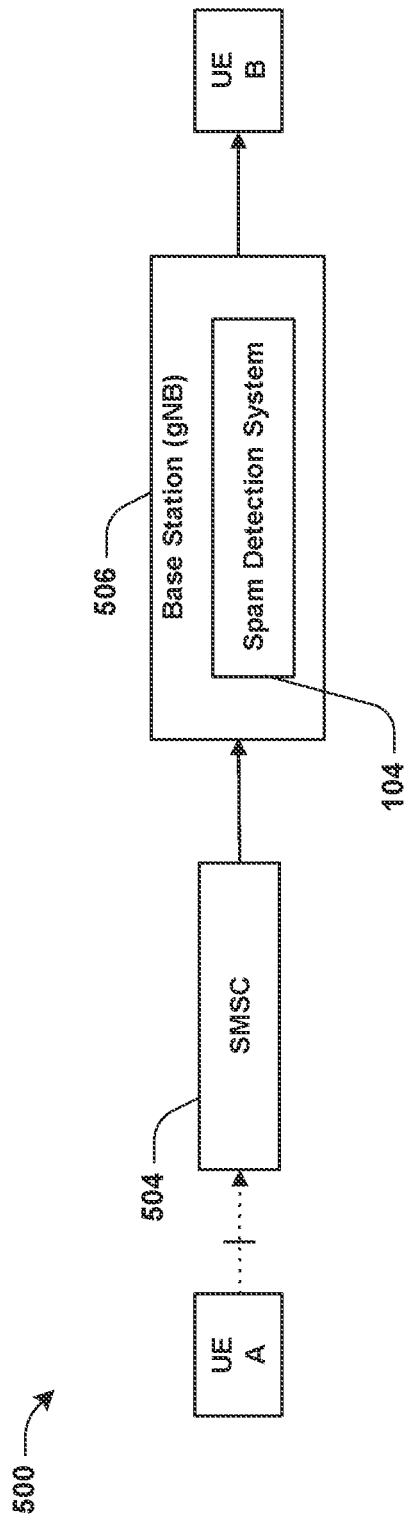
FIG. 5 is an illustration of an example system in which a spam detection system is implemented, according to some embodiments.

FIGS. 3-5 illustrate various examples of deployment strategies of the spam detection system 104. In some examples, the spam detection system 104 may be implemented in a network protocol layer of the first carrier.

In some examples, such as in a scenario in which the spam detection system 104 is implemented via centralized deployment, the spam detection system 104 may be implemented at a short message service center (SMSC) level of the first carrier. For example, the spam detection system 104 may be implemented in a SMSC of the first carrier. Alternatively and/or additionally, an instance of the spam detection system 104 may be implemented at a SMSC level for each region of one, some and/or all regions of the first carrier.

FIG. 3 illustrates a system 300 in which the spam detection system 104 is implemented via centralized deployment. In the example shown in FIG. 3, a first instance 104a of the spam detection system 104 is implemented in a first SMSC 324 (such that the first SMSC 324 is configured to implement the techniques provided herein with respect to the spam detection system 104, for example). In some examples, in response to a text message from a sender (e.g., UE A1) reaching the first SMSC 324, the first SMSC 324 may use one or more of the techniques provided herein to classify the text message as spam or not spam. In some examples, in response to a determination that the text message is spam, the first SMSC 324 may block the text message from being delivered to a recipient (e.g., UE B) of the text message. Alternatively and/or additionally, in response to the determination that the text message is spam, the first SMSC 324 may flag the text message as spam such that the recipient is notified that the text message is spam (e.g., the text message and an indication that the text message is spam may be transmitted to the recipient). In some examples, the first SMSC 324 may be at least a part of a sender network 304, wherein the first SMSC 324 may forward the text message to a receiver network 302 associated with the recipient (e.g., UE B). For example, the first SMSC 324 may forward the text message to an SMS router 318 of the receiver network 302. In some examples, the text message may be forwarded by the first SMSC 324 to the SMS router 318 via a Signal Transfer Point (STP) 320 in a Signaling System No. 7 (SS7) network, such as using Mobile Application Part (MAP) protocol. In some examples, rather than the first instance 104a of the spam detection system 104 being implemented within the first SMSC 324, the first instance 104a of the spam detection system 104 may be implemented in a first device (not shown) between the first SMSC 324 and the SMS router 318. For example, the first device may be configured to forward one or more text messages received from the first SMSC 324 to the SMS router 318. In some examples, the first device may forward a text message (received from the first SMSC 324) to the SMS router 318 via the STP 320 in the SS7 network (using MAP protocol, for example).

In some examples, a second instance 104b of the spam detection system 104 is implemented in a second SMSC 326 (such that the second SMSC 326 is configured to implement the techniques provided herein with respect to the spam detection system 104, for example). In some examples, in response to a text message from a second sender (e.g., UE A2) reaching the second SMSC 326, the second SMSC 326 may use one or more of the techniques provided herein to classify the text message as spam or not spam. In some examples, in response to a determination that the text message is spam, the second SMSC 326 may block the text message from being delivered to the recipient (e.g., UE B) of the text message. Alternatively and/or additionally, in response to the determination that the text message is spam, the second SMSC 326 may flag the text message as spam such that the recipient is notified that the text message is spam (e.g., the text message and an indication that the text message is spam may be transmitted to the recipient). In some examples, the second SMSC 326 may be at least a part of the sender network 304. For example, the second SMSC 326 may forward the text message to the SMS router 318 of the receiver network 302 (e.g., the text message may be forwarded to the SMS router 318 via a Diameter routing function (DRF) 322, such as using Diameter protocol). In some examples, rather than the second instance 104b of the spam detection system 104 being implemented within the second SMSC 326, the second instance 104b of the spam detection system 104 may be implemented in a second device (not shown) between the second SMSC 326 and the SMS router 318. For example, the second device may be configured to forward one or more text messages received from the second SMSC 326 to the SMS router 318. In some examples, second first device may forward a text message (received from the second SMSC 326) to the SMS router 318 via the DRF 322 (using Diameter protocol, for example).

In some examples, the SMS router 318 may forward one or more text messages to UE B via at least one of a home location register (HLR), a Serving General packet radio service (GPRS) Support Node (SGSN), a mobile switching center (MSC), a mobility management entity (MME), a short message service function (SMSF), an Internet Protocol Short Message Gateway (IP-SM-GW), etc. In some examples, a text message of the one or more text messages may be delivered via at least one of 2G and/or 3G Packet Switching (PS) SMS (e.g., <2/3G PS>SMS), 2G and/or 3G Circuit Switched (CS) SMS (e.g., <2/3G CS>SMS), 4G SMS, 5G SMS, IP Multimedia Subsystem (IMS) SMS, etc.

In some examples, such as in a scenario in which the spam detection system 104 is implemented via edge deployment, the spam detection system 104 may be implemented at a base station level (e.g., eNodeB (eNB) level, and/or gNodeB (gNB) level) of the first carrier. For example, the spam detection system 104 may be implemented in a base station of the first carrier. Alternatively and/or additionally, an instance of the spam detection system 104 may be implemented in each base station of one, some and/or all base stations (e.g., eNBs, gN Bs, etc.) of the first carrier.

FIGS. 4-5 illustrate examples in which the spam detection system 104 is implemented via edge deployment. FIG. 4 illustrates an example in which the spam detection system 104 is implemented in a base station 404 (e.g., a gNB or other type of base station) connected to a sender (e.g., UE A) of a text message (e.g., the base station 404 is configured to implement the techniques provided herein with respect to the spam detection system 104, for example). The base station 404 may provide cellular coverage to the sender (e.g., UE A may be within a cell for which the base station 404 provides cellular coverage). In some examples, in response to a text message from the sender (e.g., UE A) reaching the base station 404, the base station 404 may use one or more of the techniques provided herein to classify the text message as spam or not spam. In some examples, in response to a determination that the text message is spam, the base station 404 may block the text message from being delivered to a recipient (e.g., UE B) of the text message. Alternatively and/or additionally, in response to the determination that the text message is spam, the base station 404 may flag the text message as spam such that the recipient is notified that the text message is spam (e.g., the text message and an indication that the text message is spam may be transmitted to the recipient). In some examples, the base station 404 may forward the text message to a SMSC 406, wherein the SMSC 406 may forward the text message to the recipient (e.g., UE B). In the example shown in FIG. 4, the sender (e.g., UE A) and the recipient (e.g., UE B) may be on the same carrier (e.g., the first carrier).

FIG. 5 illustrates an example in which the spam detection system 104 is implemented in a base station 506 (e.g., a gNB or other type of base station) connected to a recipient (e.g., UE B) of a text message (e.g., the base station 506 is configured to implement the techniques provided herein with respect to the spam detection system 104, for example). The base station 506 may provide cellular coverage to the recipient (e.g., UE B may be within a cell for which the base station 506 provides cellular coverage). In some examples, in response to a text message from a sender (e.g., UE A) reaching the base station 506 (e.g., the text message may be forwarded to the base station 506 by a SMSC 504), the base station 506 may use one or more of the techniques provided herein to classify the text message as spam or not spam. In some examples, in response to a determination that the text message is spam, the base station 506 may block the text message from being delivered to the recipient (e.g., UE B) of the text message. Alternatively and/or additionally, in response to the determination that the text message is spam, the base station 506 may flag the text message as spam such that the recipient is notified that the text message is spam (e.g., the text message and an indication that the text message is spam may be transmitted to the recipient). In some examples, the base station 506 may forward the text message to the recipient (e.g., UE B). In the example shown in FIG. 5, the sender (e.g., UE A) and the recipient (e.g., UE B) may be on different carriers (e.g., the recipient is on the first carrier and the sender is on a carrier different than the first carrier).

It may be appreciated that although examples herein are provided with respect to classifying text messages as spam or not spam, at least some of the techniques provided herein with respect to text messages may be used to classify messages different than text messages as spam or not spam, such as at least one of instant messages, social media posts, emails, etc.

According to some embodiments, a method is provided. The method includes receiving a first text message sent by a first UE and addressed to a second UE; in response to receiving the first text message, determining a first set of information associated with the first text message, wherein the first set of information includes first sender information indicative of: a mode of transmission used by the first UE to send the first text message, a measure of text messaging activity of the first UE, a time zone of the first UE, a geolocation of the first UE, a device identifier of the first UE, a LAC of the first UE, a MCC of the first UE, a MNC of the first UE, a MAC address of the first UE, and/or a carrier of the first UE, and first message information based upon content of the first text message; and classifying the first text message as spam or not spam based upon the first set of information.

According to some embodiments, the method includes based upon the first text message being classified as spam, not transmitting the first text message to the second UE.

According to some embodiments, the method includes based upon the first text message being classified as spam, displaying, via the second UE, an indication that the first text message is spam.

According to some embodiments, determining the first set of information includes: analyzing the content of the first text message to identify a link; and determining a legitimacy status of the link, wherein the first message information is indicative of the legitimacy status.

According to some embodiments, the method includes training a neural network model using training information including a plurality of sets of information associated with a plurality of text messages, wherein each set of information of the plurality of sets of information includes sender information associated with a text message of the plurality of text messages and a sender of the text message, message information based upon content of the text message, and an indication of whether or not the text message is classified as spam, wherein classifying the text message as spam or not spam is performed using the neural network model.

According to some embodiments, the neural network model includes a multi-layer perceptron model.

According to some embodiments, the method includes generating, based upon a plurality of sets of information associated with a plurality of text messages sent by the first UE, a profile associated with the first UE, wherein a set of information of the plurality of sets of information includes: sender information associated with a text message of the plurality of text messages and the first UE, message information based upon content of the text message, and recipient information associated with the text message, wherein the recipient information is indicative of one or more actions performed by a recipient of the text message in response to receiving the text message, wherein the first set of information includes the profile.

According to some embodiments, the method includes classifying the first UE as malicious or not malicious based upon the plurality of sets of information, wherein the profile is indicative of the classification of the first UE.

According to some embodiments, determining the first set of information and/or classifying the first text message as spam or not spam are performed by: a first base station connected to the first UE; a second base station connected to the second UE; and/or a SMSC.

According to some embodiments, determining the first set of information and/or classifying the first text message as spam or not spam are performed by a first device configured to forward text messages, received from a SMSC, to a SMS router.

According to some embodiments, the measure of text messaging activity of the first UE is indicative of a rate at which the first UE sends text messages.

According to some embodiments, the first sender information is indicative of a phone number of the first UE, a mobile line of the first UE, a mobile plan associated with the mobile line of the first UE, and/or billing information associated with the mobile line of the first UE.

According to some embodiments, the method includes comparing the device identifier of the first UE with a plurality of device identifiers of compromised UEs to determine whether or not the first UE is a compromised device, wherein the first sender information includes an indication of whether or not the first UE is a compromised device.

According to some embodiments, the device identifier includes an IMEI number of the first UE.

According to some embodiments, determining the first set of information includes analyzing the content of the first text message to identify one or more spelling errors, wherein the first message information is indicative of the one or more spelling errors.

According to some embodiments, a non-transitory computer-readable medium, storing instructions that when executed perform operations, is provided. The operations include receiving a text message sent by a first user equipment (UE) and addressed to a second UE; in response to receiving the text message, determining, based upon information determined by a first carrier of the first UE and/or the second UE, a set of information associated with the text message; and classifying the text message as spam or not spam based upon the set of information.

According to some embodiments, the operations include based upon the text message being classified as spam: not transmitting the text message to the second UE; and/or displaying, via the second UE, an indication that the text message is spam.

According to some embodiments, the operations include analyzing the text message to identify a link; and determining a legitimacy status of the link, wherein the set of information includes: sender information indicative of a mode of transmission used by the first UE to send the text message, a measure of text messaging activity of the first UE, a time zone of the first UE, a geolocation of the first UE, a device identifier of the first UE, a LAC of the first UE, a MCC of the first UE, a MNC of the first UE, a MAC address of the first UE, and/or a carrier of the first UE; and message information, based upon content of the text message, including the legitimacy status.

According to some embodiments, determining the first set of information and/or classifying the text message as spam or not spam are performed by: a first base station connected to the first UE; a second base station connected to the second UE; and/or a SMSC.

According to some embodiments, a device is provided. The device includes a processor coupled to memory, the processor configured to execute instructions to perform operations. The operations include receiving a first text message sent by a first UE and addressed to a second UE; in response to receiving the first text message, determining a first set of information associated with the first text message, wherein the first set of information includes first sender information indicative of: a mode of transmission used by the first UE to send the first text message, a measure of text messaging activity of the first UE, a time zone of the first UE, a geolocation of the first UE, a device identifier of the first UE, a LAC of the first UE, a MCC of the first UE, a MNC of the first UE, a MAC address of the first UE, and/or a carrier of the first UE, and first message information based upon content of the first text message; and classifying the first text message as spam or not spam based upon the first set of information.

Figure 6:
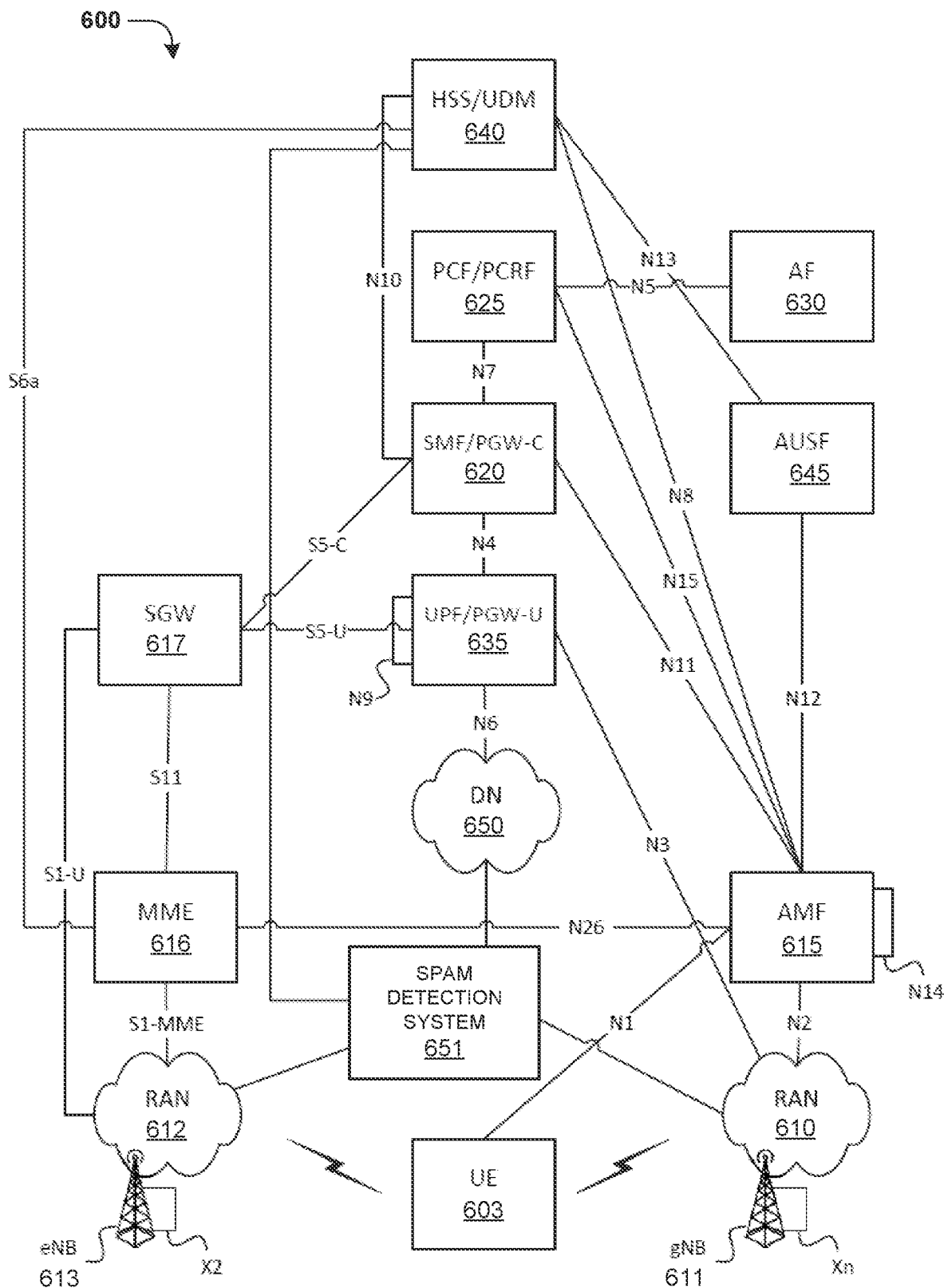
FIG. 6 is an illustration of an example environment in which at least a portion of the techniques presented herein may be utilized and/or implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 603, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as spam detection system 651.

The example shown in FIG. 6 illustrates one instance of each network component or function (e.g., one instance of SMF/PGW-C 620, PCF/PCRF 625, UPF/PGW-U 635, HSS/UDM 640, and/or 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or 645, while another slice may include a second instance of SMF/PGW-C 620, PCF/PCRF 625, UPF/PGW-U 635, HSS/UDM 640, and/or 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively and/or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 603 may include a computation and communication device, such as a wireless mobile communication device that is capable of communicating with RAN 610, RAN 612, and/or DN 650. UE 603 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 603 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 603 may communicate with one or more other elements of environment 600. UE 603 may communicate with RAN 610 via an air interface (e.g., as provided by gNB 611). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, AMF 615, and/or one or more other devices or networks) and may communicate the traffic to UE 603 via the air interface.

RAN 612 may be, or may include, a LTE RAN that includes one or more base stations (e.g., one or more eNBs 613), via which UE 603 may communicate with one or more other elements of environment 600. UE 603 may communicate with RAN 612 via an air interface (e.g., as provided by eNB 613). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, SGW 617, and/or one or more other devices or networks) and may communicate the traffic to UE 603 via the air interface.

AMF 615 may include one or more devices, systems, Virtualized Network Functions ("VNFs"), etc., that perform operations to register UE 603 with the 5G network, to establish bearer channels associated with a session with UE 603, to hand off UE 603 from the 5G network to another network, to hand off UE 603 from the other network to the 5G network, manage mobility of UE 603 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 603 with the EPC, to establish bearer channels associated with a session with UE 603, to hand off UE 603 from the EPC to another network, to hand off UE 603 from another network to the EPC, manage mobility of UE 603 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 603. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 603, from DN 650, and may forward the user plane data toward UE 603 (e.g., via RAN 610, SMF/PGW-C 620, and/or one or more other devices). In some embodiments, multiple UPFs 635 may be deployed (e.g., in different geographical locations), and the delivery of content to UE 603 may be coordinated via the N9 interface (e.g., as denoted in FIG. 6 by the line marked "N9" originating and terminating at UPF/PGW-U 635). Similarly, UPF/PGW-U 635 may receive traffic from UE 603 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 603.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 603 may communicate, through DN 650, with data servers, other UEs UE 603, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 603 may communicate.

The spam detection system 651 may include one or more devices, systems, VNFs, etc., that perform one, some and/or all operations described herein. For example, the spam detection system 651 may at least one of classify a received text message as spam or not spam, block the text message from being delivered to a recipient based upon the text message being classified as spam, transmit an indication that the text message is spam to the recipient, etc.

Figure 7:
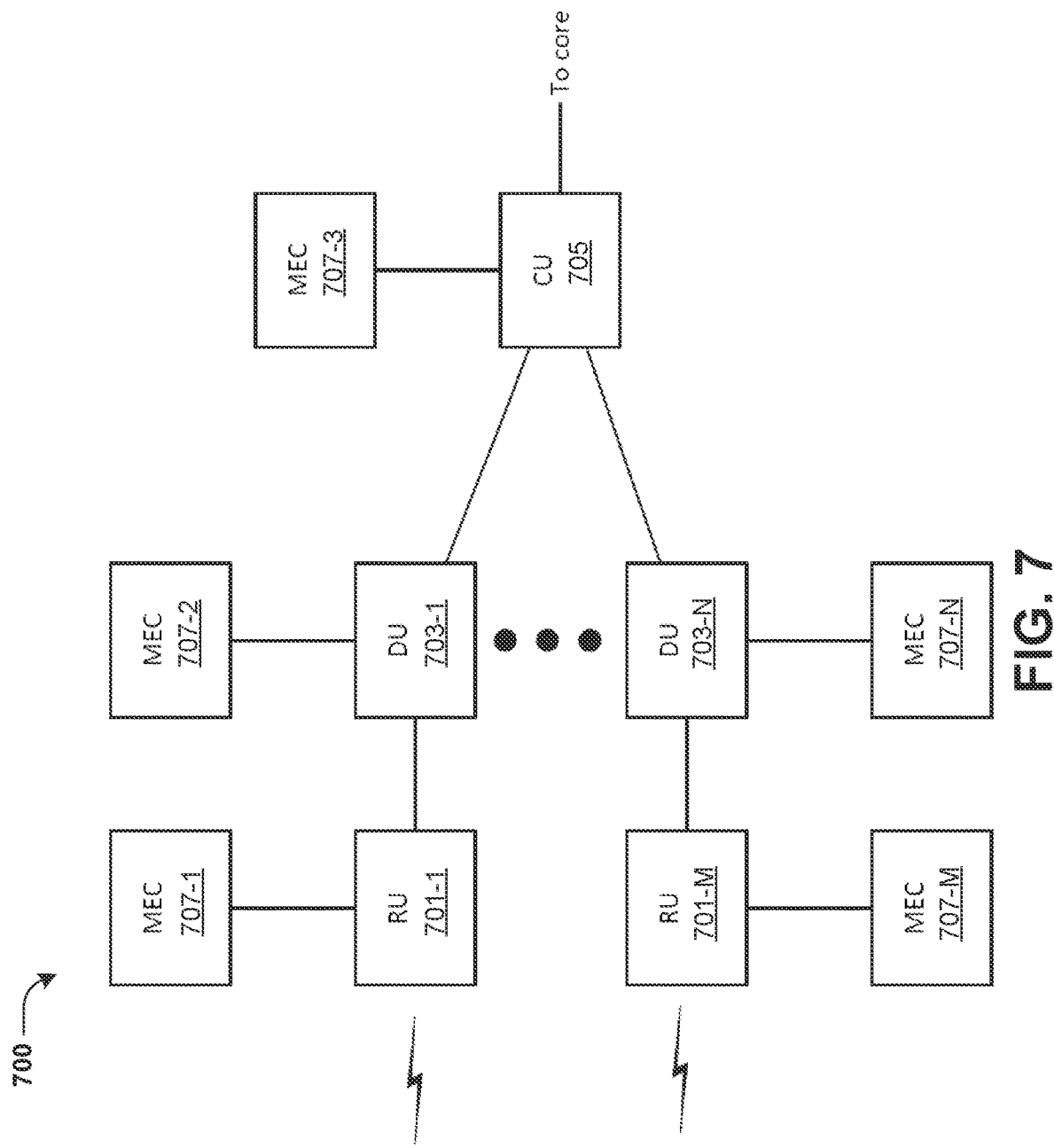
FIG. 7 is an illustration of an example network that may utilize and/or implement at least a portion of the techniques presented herein.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs UE 603 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based upon the RLC packets) on the traffic received from DUs 703.

In accordance with some embodiments, CU 705 may receive downlink traffic (e.g., traffic from the core network) for a particular UE 603, and may determine which DU(s) 703 should receive the downlink traffic. DU 703 may include one or more devices that transmit traffic between a core network (e.g., via CU 705) and UE 603 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 603.

RU 701 may include hardware circuitry (e.g., one or more RF transceivers, antennas, radios, and/or other suitable hardware) to communicate wirelessly (e.g., via an RF interface) with one or more UEs UE 603, one or more other DUs 703 (e.g., via RUs 701 associated with DUs 703), and/or any other suitable type of device. In the uplink direction, RU 701 may receive traffic from UE 603 and/or another DU 703 via the RF interface and may provide the traffic to DU 703. In the downlink direction, RU 701 may receive traffic from DU 703, and may provide the traffic to UE 603 and/or another DU 703.

RUs 701 may, in some embodiments, be communicatively coupled to one or more Multi-Access/Mobile Edge Computing ("MEC") devices, referred to sometimes herein simply as ("MECs") 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 603, via a respective RU 701.

For example, RU 701-1 may route some traffic, from UE 603, to MEC 707-1 instead of to a core network (e.g., via DU 703 and CU 705). MEC 707-1 may process the traffic, perform one or more computations based upon the received traffic, and may provide traffic to UE 603 via RU 701-1. In this manner, ultra-low latency services may be provided to UE 603, as traffic does not need to traverse DU 703, CU 705, and an intervening backhaul network between DU network 700 and the core network. In some embodiments, MEC 707 may include, and/or may implement some or all of the functionality described above with respect to at least one of the spam detection system 651, the spam detection system 104, the system 101, the method 200, etc.

Figure 8:
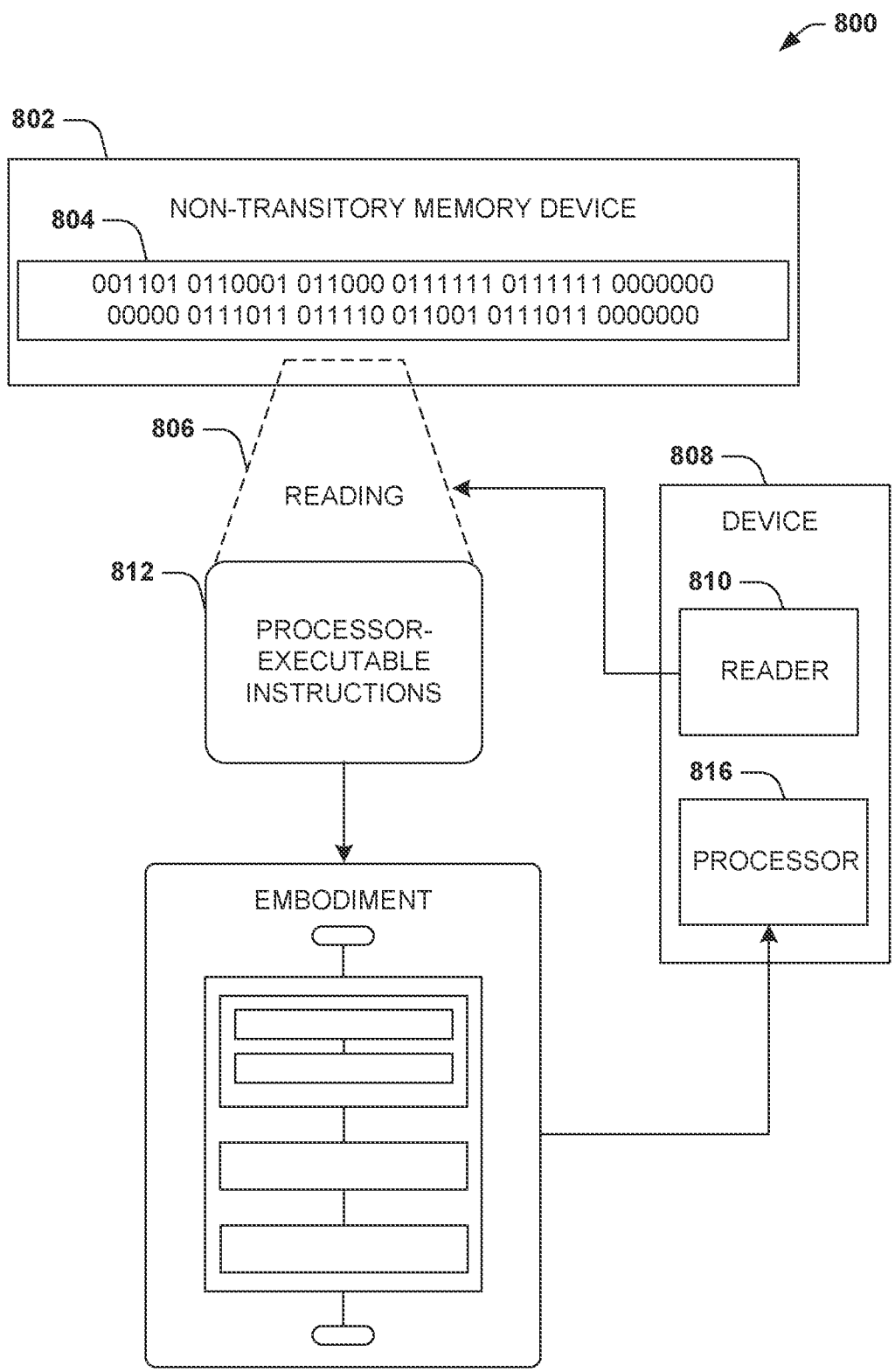
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2, for example. In some embodiments, the processor-executable instructions 812 are configured to cause implementation of a system, such as at least some of the example system 101 of FIGS. 1A-1E, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed is:

1. A method, comprising:
   receiving a first text message sent by a first user equipment (UE) and addressed to a second UE;
   in response to receiving the first text message, determining a first set of information associated with the first text message, wherein determining the first set of information comprises:
   determining first sender information associated with the first UE, comprising at least one of:
   determining a mode of transmission used by the first UE to send the first text message, wherein the mode of transmission used by the first UE indicates that the first text message was sent using retail text messaging marketing; or
   determining a time zone of the first UE that sent the first text message; and
   determining first message information based upon content of the first text message; and
   classifying the first text message as spam or not spam based upon the first set of information comprising the first sender information and the first message information.

2. The method of claim 1, comprising:
   based upon the first text message being classified as spam, not transmitting the first text message to the second UE.

3. The method of claim 1, comprising:
   based upon the first text message being classified as spam, displaying, via the second UE, an indication that the first text message is spam.

4. The method of claim 1, wherein determining the first set of information comprises:
   analyzing the content of the first text message to identify a link; and
   determining a legitimacy status of the link, wherein the first message information is indicative of the legitimacy status.

5. The method of claim 4, comprising:
   training a neural network model using training information comprising a plurality of sets of information associated with a plurality of text messages, wherein each set of information of the plurality of sets of information comprises:
   sender information associated with a text message of the plurality of text messages and a sender of the text message;
   message information based upon content of the text message; and
   an indication of whether or not the text message is classified as spam,
   wherein classifying the first text message as spam or not spam is performed using the neural network model.

6. The method of claim 1, wherein:
   determining the first sender information comprises determining the time zone of the first UE that sent the first text message.

7. The method of claim 1, comprising:
   generating, based upon a plurality of sets of information associated with a plurality of text messages sent by the first UE, a profile associated with the first UE, wherein a set of information of the plurality of sets of information comprises:
   sender information associated with a text message of the plurality of text messages and the first UE;
   message information based upon content of the text message; and
   recipient information associated with the text message, wherein the recipient information is indicative of one or more actions performed by a recipient of the text message in response to receiving the text message,
   wherein the first set of information comprises the profile.

8. The method of claim 7, comprising:
   classifying the first UE as malicious or not malicious based upon the plurality of sets of information, wherein generating the profile comprises indicating the classification of the first UE in the profile.

9. The method of claim 1, wherein:
at least one of determining the first set of information or classifying the first text message as spam or not spam are performed by at least one of:
a first base station connected to the first UE;
a second base station connected to the second UE; or
a short message service center (SMSC).

10. The method of claim 1, wherein:
at least one of determining the first set of information or classifying the first text message as spam or not spam are performed by a first device configured to forward text messages, received from a short message service center (SMSC), to a short message service (SMS) router.

11. The method of claim 1, wherein determining the first sender information comprises determining the mode of transmission used by the first UE to send the first text message, the method comprising:
receiving a second text message sent by a third UE;
in response to receiving the second text message, determining a second set of information associated with the second text message, wherein determining the second set of information comprises:
determining second sender information associated with the third UE, comprising:
determining a second mode of transmission used by the third UE to send the second text message, wherein the second mode of transmission used by the third UE is different than retail text messaging marketing; and
determining second message information based upon content of the second text message; and
classifying the second text message as spam or not spam based upon the second set of information comprising the second sender information and the second message information, wherein the second text message is classified differently than the first text message.

12. The method of claim 1, wherein:
the first sender information is indicative of at least one of:
a phone number of the first UE;
a mobile line of the first UE;
a mobile plan associated with the mobile line of the first UE; or
billing information associated with the mobile line of the first UE.

13. The method of claim 1, comprising:
comparing a device identifier of the first UE with a plurality of device identifiers of compromised UEs to determine whether or not the first UE is a compromised device, wherein determining the first sender information comprises indicating within the first sender information whether or not the first UE is a compromised device.

14. The method of claim 13, wherein the device identifier comprises:
an International Mobile Equipment Identity (IMEI) number of the first UE.

15. The method of claim 1, wherein determining the first set of information comprises:
analyzing the content of the first text message to identify one or more spelling errors, wherein the first message information is indicative of the one or more spelling errors.

16. A device comprising:
a processor coupled to memory, the processor configured to execute instructions to perform operations comprising:
receiving a first text message sent by a first user equipment (UE) and addressed to a second UE;
in response to receiving the first text message, determining a first set of information associated with the first text message, wherein determining the first set of information comprises:
determining first sender information associated with the first UE, comprising at least one of:
determining a mode of transmission used by the first UE to send the first text message, wherein the mode of transmission used by the first UE indicates that the first text message was sent using retail text messaging marketing; or
determining a time zone of the first UE that sent the first text message; and
determining first message information based upon content of the first text message; and
classifying the first text message as spam or not spam based upon the first set of information comprising the first sender information and the first message information.

17. The device of claim 16, the operations comprising:
based upon the first text message being classified as spam, not transmitting the first text message to the second UE.

18. The device of claim 16, the operations comprising:
based upon the first text message being classified as spam, displaying, via the second UE, an indication that the first text message is spam.

19. A non-transitory computer-readable medium storing instructions that when executed perform operations comprising:
receiving a first text message sent by a first user equipment (UE) and addressed to a second UE;
in response to receiving the first text message, determining a first set of information associated with the first text message, wherein determining the first set of information comprises:
determining first sender information associated with the first UE, comprising at least one of:
determining a mode of transmission used by the first UE to send the first text message, wherein the mode of transmission used by the first UE indicates that the first text message was sent using retail text messaging marketing; or
determining a time zone of the first UE that sent the first text message; and
determining first message information based upon content of the first text message; and
classifying the first text message as spam or not spam based upon the first set of information comprising the first sender information and the first message information.

20. The non-transitory computer-readable medium of claim 19, the operations comprising:
based upon the first text message being classified as spam, at least one of not transmitting the first text message to the second UE or displaying, via the second UE, an indication that the first text message is spam.

* * * * *